United States Patent
Ando

(10) Patent No.: US 9,756,202 B2
(45) Date of Patent: Sep. 5, 2017

(54) INFORMATION PROCESSING SYSTEM, INFORMATION PROCESSING METHOD AND COMPUTER PROGRAM PRODUCT

(71) Applicant: Mitsuo Ando, Fukuoka (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/155,459

(22) Filed: May 16, 2016

(65) Prior Publication Data

US 2016/0344881 A1 Nov. 24, 2016

(30) Foreign Application Priority Data

May 20, 2015 (JP) ................. 2015-102389

(51) Int. Cl.
  *G06F 3/12* (2006.01)
  *H04N 1/00* (2006.01)
  *H04L 29/08* (2006.01)

(52) U.S. Cl.
  CPC ......... *H04N 1/00464* (2013.01); *H04L 67/12* (2013.01); *H04N 1/00204* (2013.01); *H04N 1/00244* (2013.01); *H04N 2201/0094* (2013.01)

(58) Field of Classification Search
  USPC ...................................... 358/1.15
  See application file for complete search history.

(56) References Cited

U.S. PATENT DOCUMENTS

| | | | |
|---|---|---|---|
| 7,957,021 B2 | 6/2011 | Moroi | |
| 8,988,693 B2 | 3/2015 | Ando | |
| 9,124,733 B2 | 9/2015 | Ando | |
| 9,235,453 B2 | 1/2016 | Ando | |
| 2007/0050711 A1* | 3/2007 | Walker | G06F 17/30855 715/205 |
| 2007/0165265 A1 | 7/2007 | Ito et al. | |

(Continued)

FOREIGN PATENT DOCUMENTS

| | | |
|---|---|---|
| JP | 2003-283718 | 10/2003 |
| JP | 2005-024994 | 1/2005 |

(Continued)

*Primary Examiner* — Jerome Grant, II
(74) *Attorney, Agent, or Firm* — Oblon, McClelland, Maier & Neustadt, L.L.P.

(57) ABSTRACT

An information processing system includes a device; and an information processing apparatus including a conversion unit configured to convert second data in a second format, different from a first format processable for the device, to generate first data in the first format; a first transmission unit configured to send the first data to the device; a reception unit configured to receive information indicating an operation to a screen, displayed on a display unit of the device based on the first data; and a second transmission unit configured to send to the device, an instruction to perform processing related to the operation indicated by the information, the processing being defined in the second data. The device includes an acquisition unit configured to acquire data that is an object to be processed in the processing performed in accordance with the instruction, via a network without passing through the information processing apparatus.

12 Claims, 31 Drawing Sheets

(56) References Cited

U.S. PATENT DOCUMENTS

| | | | |
|---|---|---|---|
| 2008/0086369 A1* | 4/2008 | Kiat | G06Q 30/02 |
| | | | 705/14.41 |
| 2011/0047450 A1* | 2/2011 | Park | H04N 1/00204 |
| | | | 715/234 |
| 2014/0146363 A1 | 5/2014 | Hirokawa et al. | |
| 2014/0240748 A1* | 8/2014 | Ohno | G06F 3/1273 |
| | | | 358/1.14 |
| 2014/0253939 A1* | 9/2014 | Hashimoto | G06F 3/1232 |
| | | | 358/1.13 |
| 2015/0256716 A1* | 9/2015 | Yasuhara | H04L 67/025 |
| | | | 358/1.14 |
| 2015/0264200 A1 | 9/2015 | Ando | |
| 2015/0281332 A1 | 10/2015 | Naito et al. | |
| 2015/0326751 A1 | 11/2015 | Ando | |
| 2016/0080587 A1 | 3/2016 | Ando | |
| 2016/0085517 A1* | 3/2016 | Hasegawa | G06F 11/36 |
| | | | 717/109 |
| 2016/0119506 A1 | 4/2016 | Namihira et al. | |

FOREIGN PATENT DOCUMENTS

| | | |
|---|---|---|
| JP | 2006-203869 | 8/2006 |
| JP | 2006-352845 | 12/2006 |
| JP | 2014-026424 | 2/2014 |
| JP | 2014-182793 | 9/2014 |

* cited by examiner

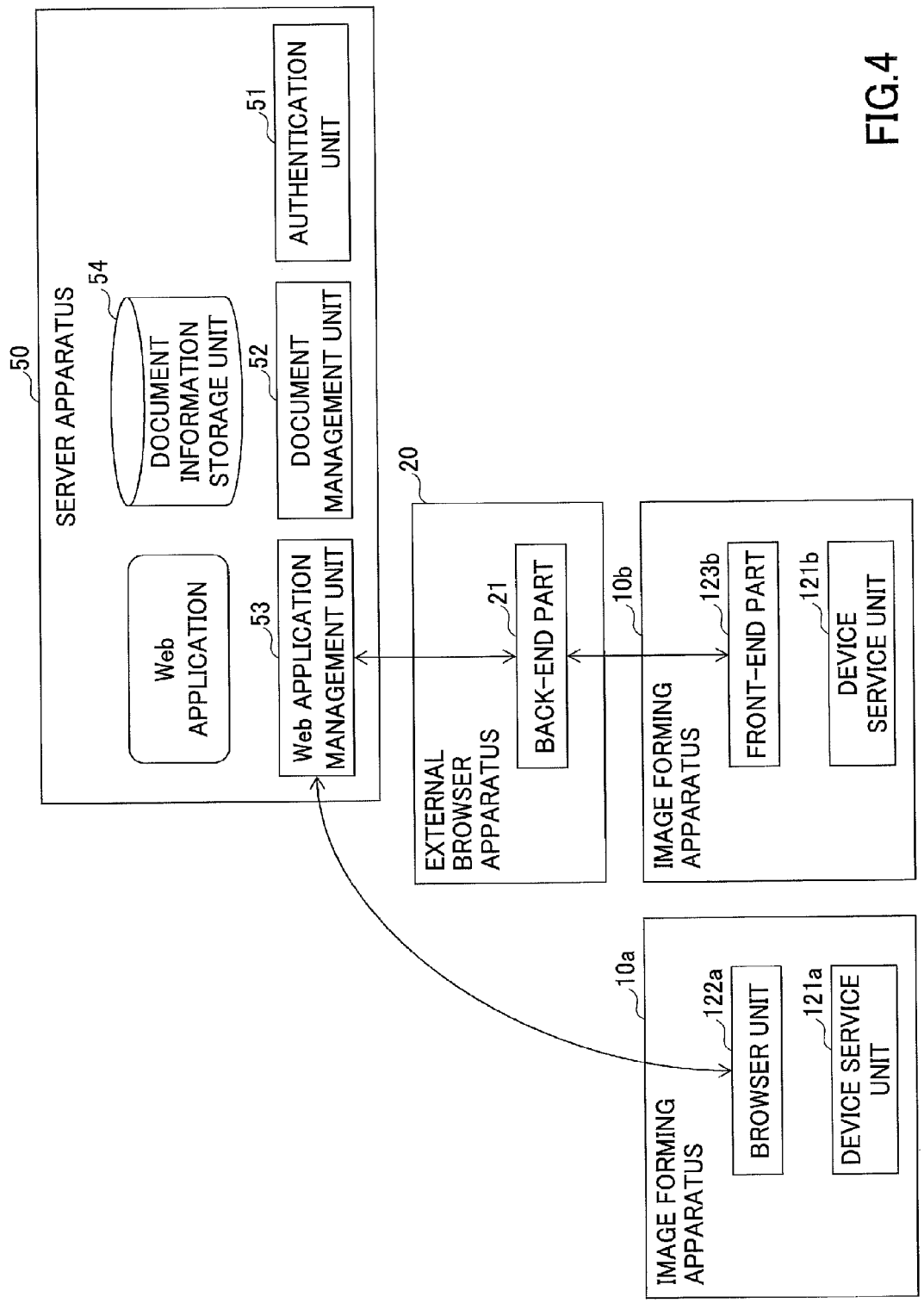

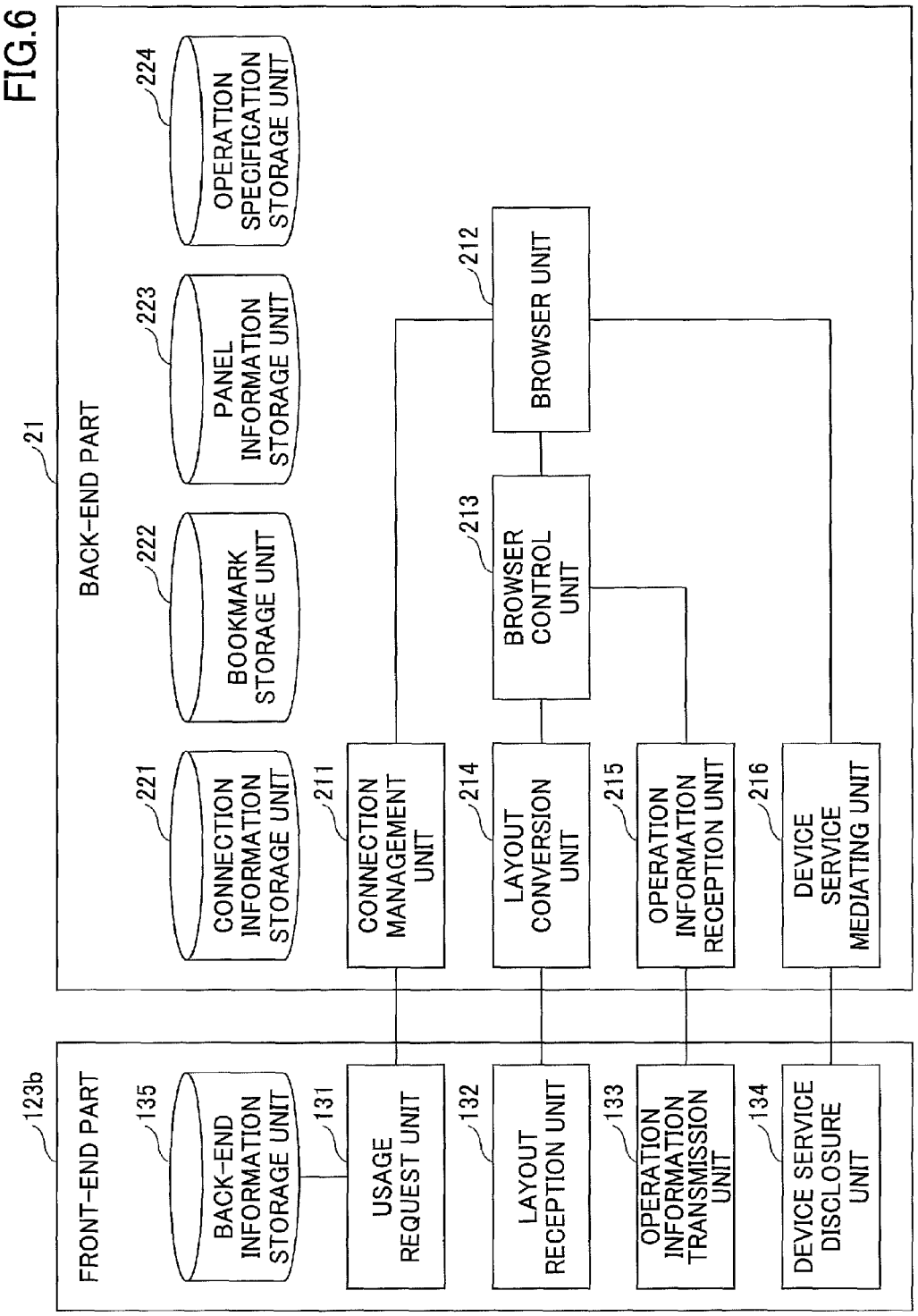

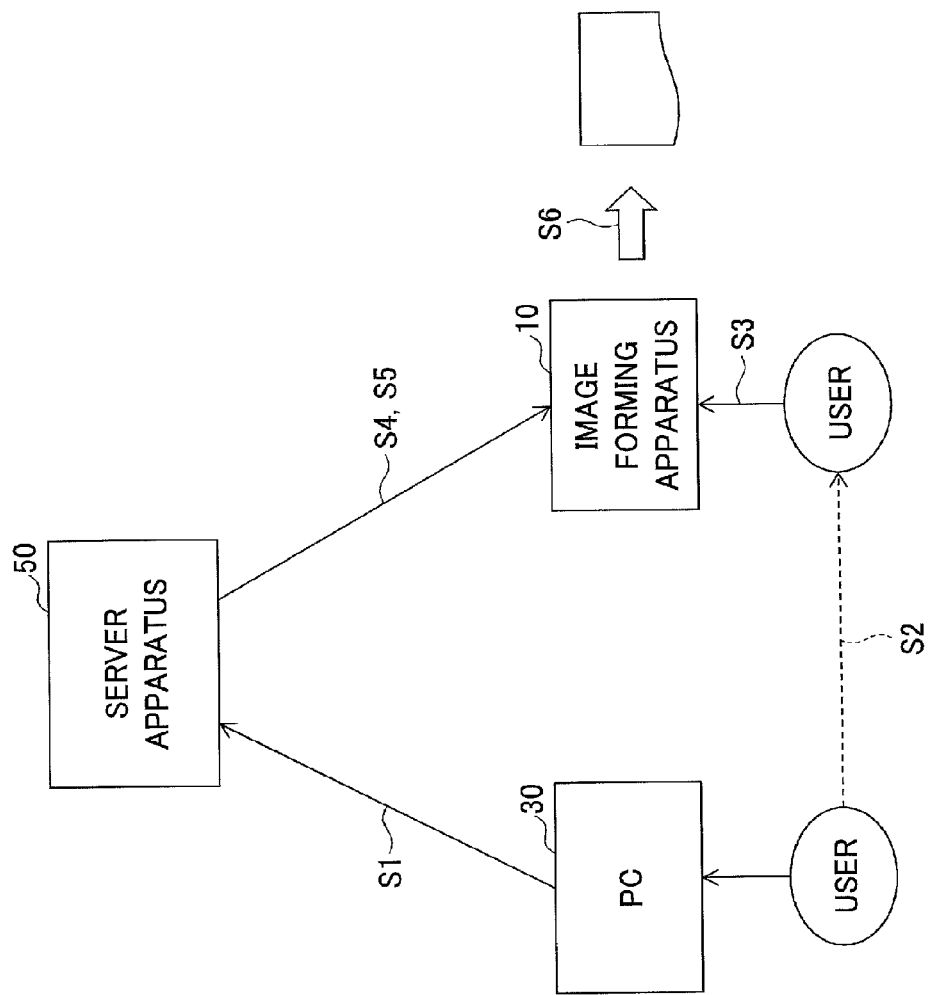

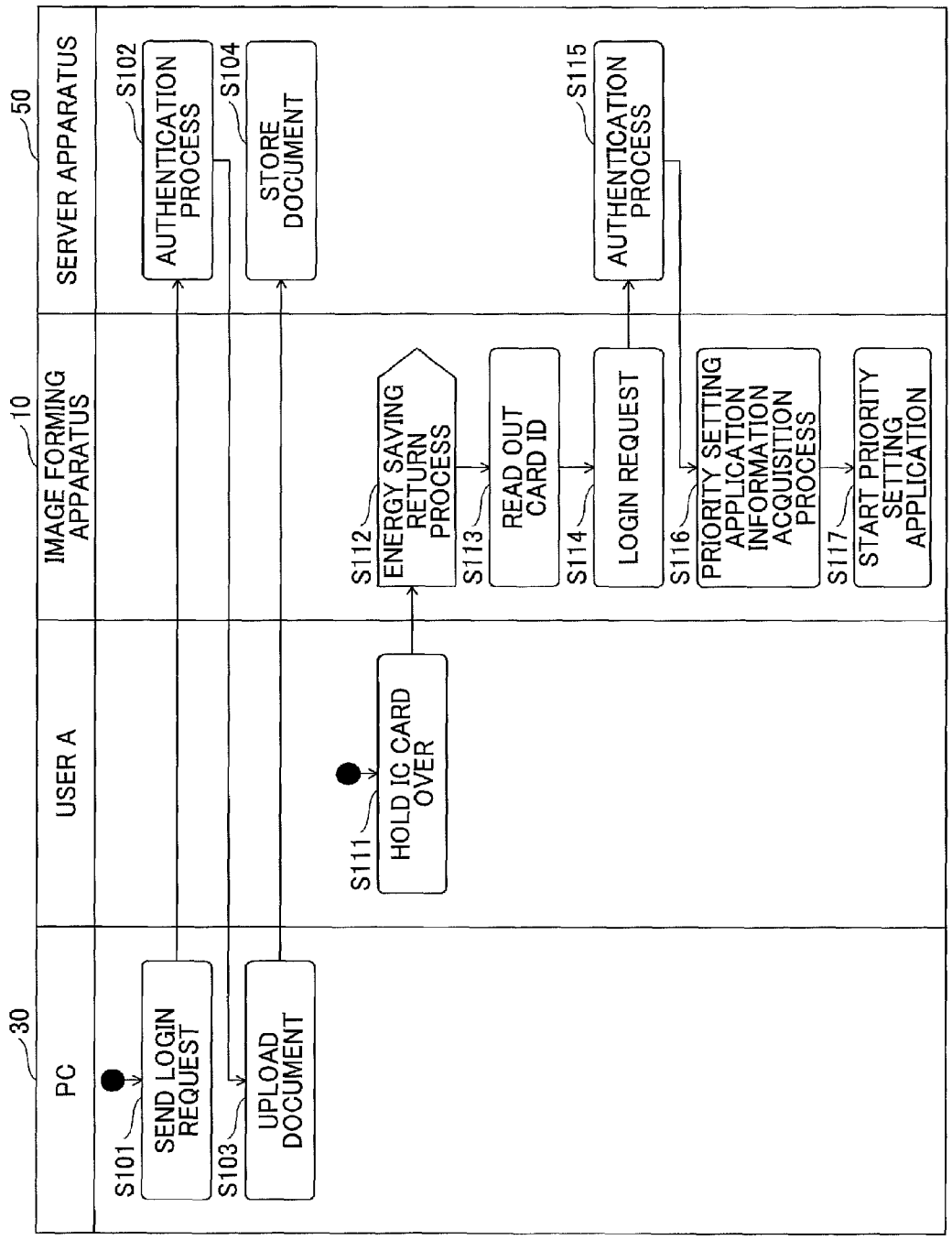

FIG.9

| DOCUMENT ID | CATEGORY | URI | NUMBER OF PAGES | SIZE | DATE AND TIME | CREATOR | FORMAT | DESTINATION |
|---|---|---|---|---|---|---|---|---|
| 1855 | REPORT | rrr.com/Hello.jpg | 1 | 1MB | 2/6 12:01 | A | jpeg | A |
| 1856 | SLIP | rrr.com/Color.pdf | 10 | 2MB | 2/6 11:50 | B | pdf | A |
| .. | .. | .. | .. | .. | .. | .. | .. | .. |

```
{ "doclist": [
            {
"file"      : "Hello.jpg",
"page"      : "1",
"DocID"     : "Doc1855"
},
            {
"file"      : "Color.pdf",
"page"      : "10",
"DocID"     : "Doc1856"
},
            {
"file"      : "Mono.doc",
"page"      : "100",
"DocID"     : "Doc1857"
}
]}
```

FIG.18

| PRIORITY ORDER | LOCATION DIVISION | URL |
|---|---|---|
| 1 | Internet | http://cottoncloud.com |
| 2 | INTRANET | http://10.56.60.11/coton |

| USER ID | APPLICATION NAME | URL | PRIORITY |
|---|---|---|---|
| A | CLOUD PULL PRINT | http://pullprint.com | ○ |
|  | LAUNCHER | http://... | .. |
| B | CLOUD SCAN | http://... | .. |
| .. | .. | .. | .. |

| MACHINE NUMBER | MACHINE NAME | PANEL SIZE | COLOR REPRESENTATION | PIXEL OPERATION | STILL IMAGE | MOVING IMAGE | FONT SIZE | OPERATION METHOD |
|---|---|---|---|---|---|---|---|---|
| 1234 | COLOR IMAGE FORMING APPARATUS | 600 × 800 | 256 | × | ○ | × | 8,12 | PANEL TOUCH |
| 5678 | SIMPLE IMAGE FORMING APPARATUS | 300 × 400 | 2 | × | ○ | × | 8 | HARD KEY |

| MACHINE NUMBER | TOUCH EVENT | SCROLL | SWIPE | FLICK | ZOOM |
|---|---|---|---|---|---|
| 1234 | SINGLE | ○ | × | × | × |
| 5678 | — | — | — | — | — |

| USER ID | MACHINE NUMBER | BROWSER ID | Web APPLICATION |
|---|---|---|---|
| A | 1234 | 0123 | http://pullprint.com |
| ·· | ·· | ·· | ·· |

| DOCUMENT ID | CATEGORY | URI | NUMBER OF PAGES | SIZE | DATE AND TIME | CREATOR | FORMAT | DESTINATION | STATUS |
|---|---|---|---|---|---|---|---|---|---|
| 1855 | REPORT | rrr.com/Hello.jpg | 1 | 1MB | 2/6 12:01 | A | jpeg | A | ACQUIRED |
| 1856 | SLIP | rrr.com/Color.pdf | 10 | 2MB | 2/6 11:50 | B | pdf | A | 1 |
| .. | .. | .. | .. | .. | .. | .. | .. | .. | .. |

143

INFORMATION PROCESSING SYSTEM, INFORMATION PROCESSING METHOD AND COMPUTER PROGRAM PRODUCT

CROSS-REFERENCE TO RELATED APPLICATIONS

The present application claims benefit of priority under 35 U.S.C. §119 of Japanese Patent Application No. 2015-102389, filed May 20, 2015. The contents of said application are incorporated herein by reference in their entirety.

BACKGROUND OF THE INVENTION

1. Field of the Invention

The disclosures herein generally relate to an information processing system, an information processing method and a computer program product.

2. Description of the Related Art

There are apparatuses that have application platforms and can implement application programs for controlling the apparatuses. Such application platforms may be substantially modified according to technological innovations, requirements from market, developments of new models or the like. For example, shift from application platforms provided with application program interfaces (API) by programming languages such as C language or Java (trademark registered) language to browser-based application platforms is performed. The browser-based application platform is fundamentally an application platform where a Web browser is an operation environment. In the browser-based application platform, application programs, which are developed by using HTML (HyperText Markup Language), CSS (Cascading Style Sheets), JavaScript (trademark registered) and the like (hereinafter referred to as "Web application"), operate.

When the shift of application platform is performed, in markets, a plurality of kinds of application platforms may be mixed. In such a situation, support for all the application platforms may be required for manufacturers of apparatuses. In such a case, for example, for a certain application program, operations in the same manner in the respective application platforms are required.

SUMMARY OF THE INVENTION

It is a general object of at least one embodiment of the present invention to provide an information processing system, an information processing method and a computer program product that substantially obviate one or more problems caused by the limitations and disadvantages of the related art.

In one embodiment, an information processing system includes a device; and an information processing apparatus that can communicate with the device. The information processing apparatus includes a conversion unit configured to convert data in a second format, different from a first format processable for the device, to generate data in the first format; a first transmission unit configured to send the data generated by the conversion unit to the device; a reception unit configured to receive, from the device, information indicating an operation to a screen, which is displayed on a display unit of the device based on the data sent by the first transmission unit; and a second transmission unit configured to send, to the device, an instruction to perform processing related to the operation indicated by the information received by the reception unit, the processing being defined in the data in the second format. The device includes an acquisition unit configured to acquire data that is an object to be processed in the processing performed in accordance with the instruction, via a network without passing through the information processing apparatus.

In another embodiment, an information processing method includes converting, by an information processing apparatus that can communicate with a device, second data in a second format, different from a first format processable for the device, to generate first data in the first format; sending the first data from the information processing apparatus to the device; receiving, by the information processing apparatus, from the device, information indicating an operation to a screen, which is displayed on a display unit of the device based on the first data; sending from the information processing apparatus to the device, an instruction to perform processing related to the operation indicated by the information, the processing being defined in the second data; and acquiring, by the device, third data that is an object to be processed in the processing performed in accordance with the instruction, via a network without passing through the information processing apparatus.

In yet another embodiment, a computer program product is executed on a device or an information processing apparatus that can communicate with the device. The computer program product includes converting, by the information processing apparatus, second data in a second format, different from a first format processable for the device, to generate first data in the first format; sending the first data from the information processing apparatus to the device; receiving, by the information processing apparatus, from the device, information indicating an operation to a screen, which is displayed on a display unit of the device based on the first data; sending from the information processing apparatus to the device, an instruction to perform processing related to the operation indicated by the information, the processing being defined in the second data; and acquiring, by the device, third data that is an object to be processed in the processing performed in accordance with the instruction, via a network without passing through the information processing apparatus.

BRIEF DESCRIPTION OF THE DRAWINGS

Other objects and further features of embodiments will become apparent from the following detailed description when read in conjunction with the accompanying drawings, in which:

FIG. 4 is a diagram for explaining an example functional configuration of respective apparatuses according to the first embodiment;

FIG. 6 is a diagram depicting an example functional configuration of the back-end part and a front-end part according to the first embodiment;

FIG. 7 is a diagram for explaining schematically cloud pull print;

FIG. 8 is a diagram for explaining an example process executed regardless of compatibility with a Web application regarding the cloud pull print;

FIG. 9 is a diagram depicting an example configuration of a document information storage unit;

FIG. 13 is a diagram depicting an example document list data;

FIG. 18 is a diagram depicting an example design of a back-end information storage unit;

FIG. 19 is a diagram depicting an example design of a bookmark storage unit;

FIG. 20 is a diagram depicting an example design of a panel information storage unit;

FIG. 21 is a diagram depicting an example design of an operation specification storage unit;

FIG. 22 is a diagram depicting an example design of a connection information storage unit;

FIG. 32 is a diagram depicting an example design of an acquisition data storage unit;

DESCRIPTION OF THE PREFERRED EMBODIMENTS

First Embodiment

Figure 1:
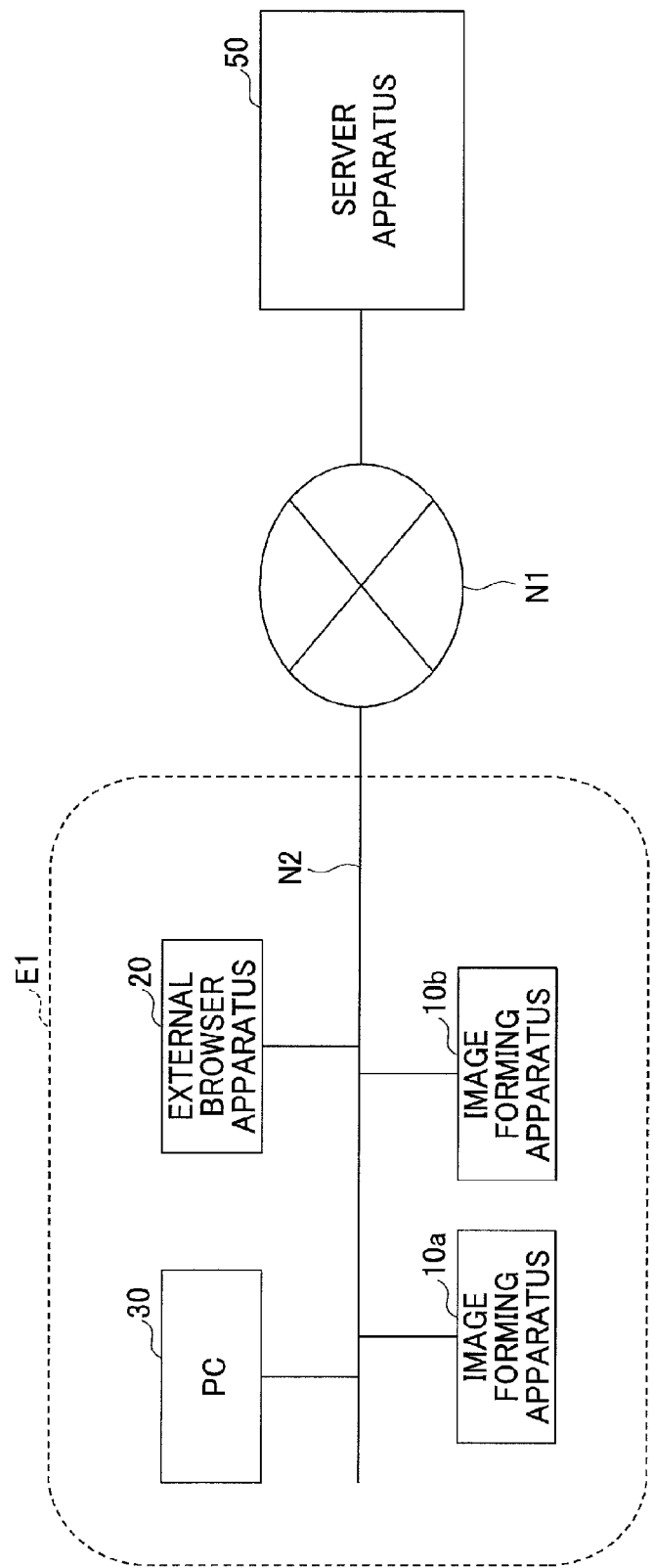
FIG. 1 is a diagram depicting an example system arrangement according to a first embodiment.

In the following, a first embodiment of the present invention will be described with reference to the accompanying drawings. FIG. 1 is a diagram depicting an example system arrangement according to the first embodiment. In FIG. 1, a user environment E1 and a server apparatus 50 are coupled to each other for a communications connection via a network N1 such as the Internet.

The user environment E1 is a system environment in an organization such as a company. In the user environment E1, an image forming apparatus 10a, an image forming apparatus 10b and the like (in the following, when each of them is not distinguished, they are simply referred to as "image forming apparatus 10") an external browser apparatus 20 and a PC 30 are coupled to each other via a network N2, such as an intranet inside the user environment E1, for a communications connection.

The image forming apparatus 10 is a multifunction peripheral. However, the image forming apparatus 10 may be an output apparatus, such as a printer other than the multifunction peripheral described here.

In the embodiment, the image forming apparatus 10a and the image forming apparatus 10b have application platforms which are different from each other. The image forming apparatus 10a is an image forming apparatus 10 provided with a Web browser as the application platform. The image forming apparatus 10b is an image forming apparatus 10 having an application platform provided with an API (Application Program Interface) of the C language, the Java (trademark registered) language or the like. The image forming apparatus 10b may have a Web browser of an old version. The web browser of the old version is a web browser which does not have compatibility with an application program operating on the Web browser (in the following referred to as a "Web application") of the image forming apparatus 10a. Therefore, the Web application developed for the Web browser of the image forming apparatus 10a cannot operate directly in the image forming apparatus 10b. The Web application is an application program developed by using HTTP (HyperText Transfer Protocol), CSS (Cascading Style Sheets), a script and the like. The script is, for example, JavaScript (trademark registered). The Web browser, which the image forming apparatus 10a is provided with, can interpret (process) a method defined for control of the image forming apparatus 10a (in the following, referred to as "extension method"). In other words, it is possible to install a Web application which controls the image forming apparatus 10a using the extension method. The extension method includes, for example, a method corresponding to an instruction for executing printing or an instruction for executing scanning.

The external browser apparatus 20 is a computer such as a PC (Personal Computer) which has a function for ensuring compatibility with the image forming apparatus 10a regarding the image forming apparatus 10b. That is, the external browser apparatus 20 has a function for making a Web application for the image forming apparatus 10a usable in the image forming apparatus 10b. The external browser apparatus 20 may be arranged outside the user environment E1. For example, the external browser apparatus 20 may be coupled to the network N1.

The PC 30 is a Personal Computer (PC) that a user in the user environment E1 uses.

The server apparatus 50 is one or more computers for providing a variety of services to the image forming apparatus 10. For example, the server apparatus 50 performs a delivery of a Web application corresponding to the image forming apparatus 10a, a process in cooperation with the Web application or the like. The server apparatus 50 may be arranged inside the user environment E1. For example, the server apparatus 50 may be coupled to the network N2.

Figure 2:
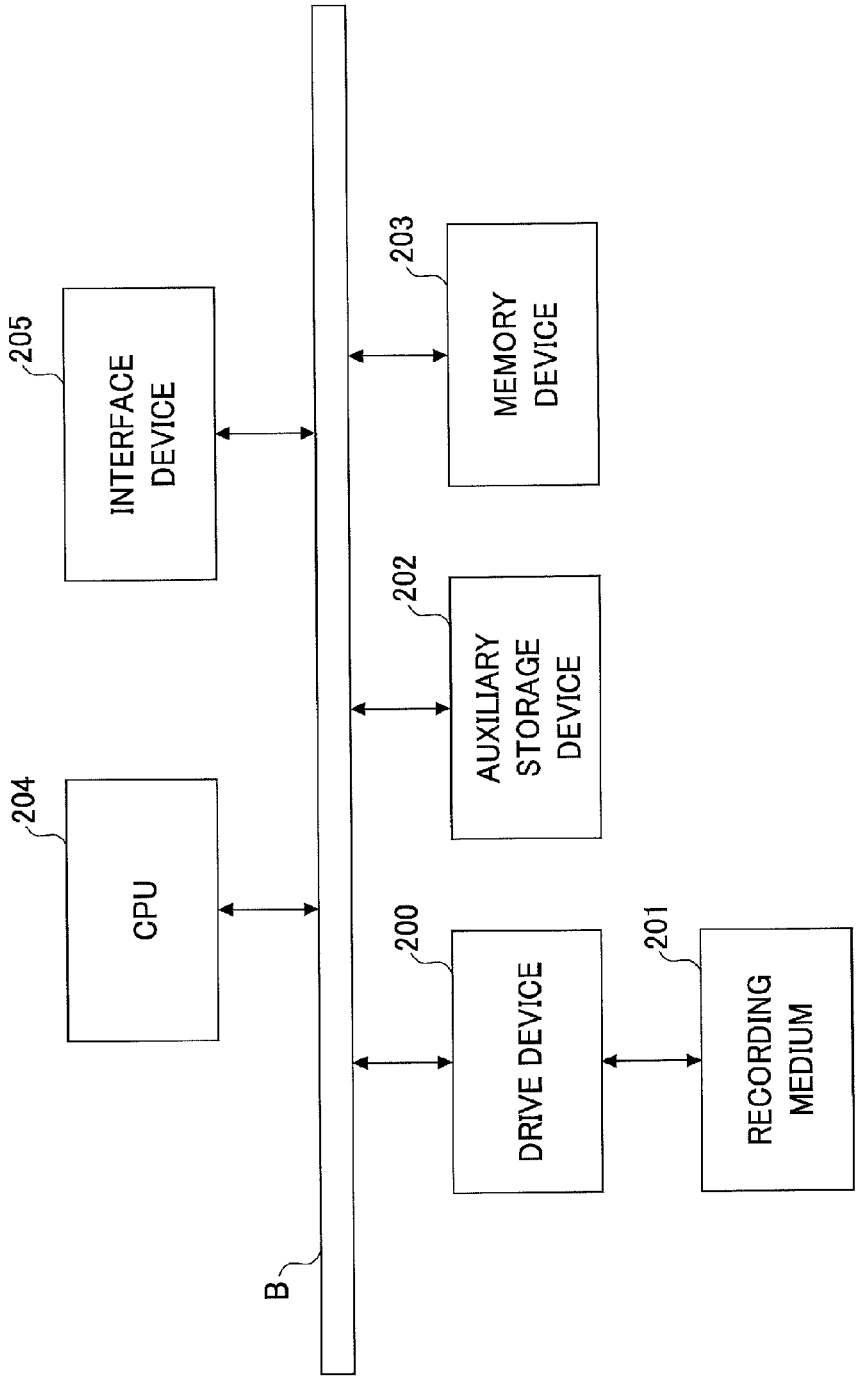
FIG. 2 is a diagram depicting an example hardware configuration of an external browser apparatus according to the first embodiment.

FIG. 2 is a diagram depicting an example hardware configuration of the external browser apparatus 20 according to the first embodiment. The external browser apparatus 20 shown in FIG. 2 includes a drive device 200, an auxiliary storage device 202, a memory device 203, a CPU 204 and an interface device 205, which are coupled to each other respectively via a bus B.

A program that enables processing in the external browser apparatus 20 is provided by a recording medium 201 such as a CD-ROM. When the recording medium 201 storing the program is set in the drive device 200, the program is installed from the recording medium 201 to the auxiliary storage device 202 via the drive device 200. The installation of the program is not necessarily performed from the recording medium 201, but may be performed by downloading from another computer via a network. The auxiliary storage device 202 stores the program which is installed and stores a necessary file, data or the like.

The memory device 203 reads out a program from the auxiliary storage device 202 and stores it, when an instruction for starting the program is issued. The CPU 204 executes a function regarding the external browser apparatus 20 according to the program stored in the memory device 203. The interface device 205 is used as an interface for connecting to a network.

The external browser apparatus 20 may be a plurality of computers having hardware, as shown in FIG. 2. That is, the processing performed by the external browser apparatus 20 may be executed dispersedly by the plurality of computers, which will be described later.

Figure 3:
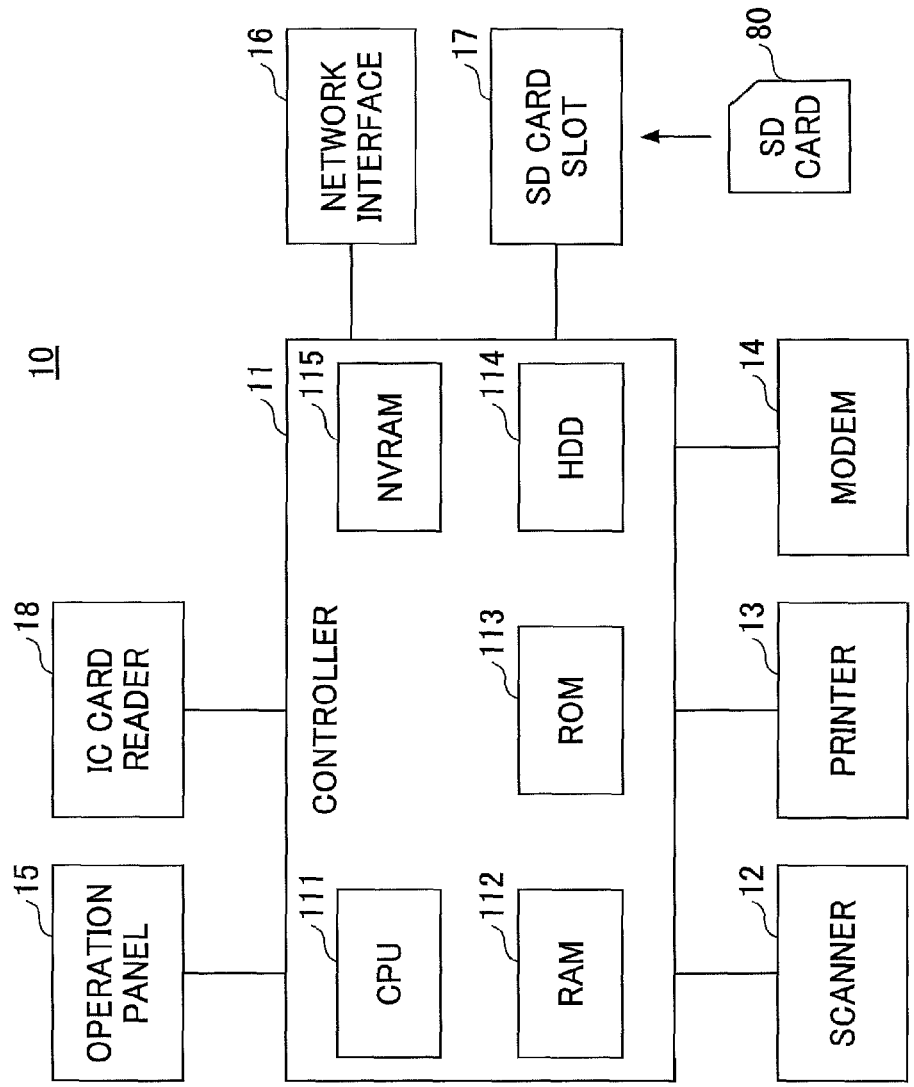
FIG. 3 is a diagram depicting an example hardware configuration of an image forming apparatus according to the first embodiment.

FIG. 3 is a diagram depicting an example hardware configuration of the image forming apparatus according to the first embodiment. In FIG. 3, the image forming apparatus 10 includes hardware, such as a controller 11, a scanner 12, a printer 13, a modem 14, an operation panel 15, a network interface 16, an SD card slot 17 and an IC card reader 18.

The controller 11 includes a CPU 111, a RAM 112, a ROM 113, an HDD 114, an NVRAM 115 and the like. The ROM 113 stores a variety of programs, data used by the program or the like. The RAM 112 is used as a storage region for loading a program, a work region for the loaded program or the like. The CPU 111 enables a variety of functions by processing the program loaded on the RAM 112. The HDD 114 stores programs, a variety of data used by the programs or the like. The NVRAM 115 stores a variety of setting information or the like.

The scanner 12 is hardware for reading out image data from a document (image reading means). The printer 13 is hardware for printing print data on a print paper (printing means). The modem 14 is hardware for connecting to a phone line, and used for sending/receiving image data by facsimile communications. The operation panel 15 is hardware provided with an inputting means, such as buttons, for accepting an input from a user, a display means, such as a liquid crystal panel, or the like. The network interface 16 is hardware for connecting to a network such as a LAN (wired and wireless are not inquired). The SD card slot 17 is used for reading out a program stored in an SD card 80. That is, in the image forming apparatus 10, not only the program stored in the ROM 113 but also the program stored in the SD card 80 can be loaded on the RAM 112 and executed. The SD card 80 may be substituted for by another recording medium (for example, a CD-ROM, a USB (Universal Serial Bus) memory or the like). That is, a kind of a recording medium corresponding to a position of the SD card 80 is not limited to a predetermined one. In this case, the SD card slot 17 only has to be substituted for by hardware according to the kind of the recording medium. The IC card reader 18 reads out a card ID from an IC card distributed to each user. The card ID is identification information for each card. In the embodiments, the card ID is used as identification information for each user.

FIG. 4 is a diagram explaining example functional configurations of the respective apparatuses according to the first embodiment. In FIG. 4, the server apparatus 50 includes an authentication unit 51, a document management unit 52, a Web application management unit 53 and the like. The respective units are enabled by a process in which one or more programs installed in the server apparatus 50 are executed by the CPU of the server apparatus 50. The server apparatus 50 further includes a document information storage unit 54. The document information storage unit 54 can be realized, for example, by using an auxiliary storage device of the server apparatus 50, a storage device which can be coupled to the server apparatus 50 via a network, or the like.

The authentication unit 51 performs authentication for a user who uses a service that the server apparatus 50 provides. The document management unit 52 manages a document, bibliographic information of which is stored in the document information storage unit 54. In the embodiments, "document" means an abstract idea against existence of a digitized document, an image or the like. The Web application management unit 53 performs provision of content of a Web application or the like.

The image forming apparatus 10a includes a browser unit 122a, a device service unit 121a, and the like. The browser unit 122a and the device service unit 121a are enabled by a process in which one or more programs installed in the image forming apparatus 10a are executed by the CPU 111 of the image forming apparatus 10a. The device service unit 121a realizes a variety of functions regarding the image forming apparatus 10a. For example, the device service unit 121a provides to the browser unit 122a an interface (API) related to control of the hardware of the image forming apparatus 10a. The browser unit 122a functions as a Web browser. For example, the browser unit 122a downloads content data (HTML, CSS, script and the like) of the Web application, and executes a process according to a content of definition for the content data.

The external browser apparatus 20 includes a back-end part 21. The back-end part 21 includes a Web browser having compatibility with the browser unit 122a of the image forming apparatus 10a. That is, the back-end part 21 can interpret (processable) the content of definition for the content data of the Web application for the image forming apparatus 10a. The back-end part 21 analyzes the content of definition for the content data of the Web application, and virtually draws the content data. The back-end part 21 converts a result of virtually drawing into a format that the image forming apparatus 10b can process (interpret), and provides a result of conversion to the image forming apparatus 10b.

The image forming apparatus 10b includes a front-end part 123b, a device service unit 121b and the like. The device service unit 121b is enabled by a process in which one or more programs installed in the image forming apparatus 10b are executed by the CPU 111 of the image forming apparatus 10b. The device service unit 121b realizes a variety of functions regarding the image forming apparatus 10b. For example, the device service unit 121b provides to the front-end part 123b an interface (API) related to control of the hardware of the image forming apparatus 10b. The interface, implementation or the like for the respective device service units 121a and 121b may be different from each other.

The front-end part 123b performs display or the like of a screen for the operation panel 15, based on information (result of conversion) provided from the back-end part 21b. Moreover, the front-end part 123b reports information indicating an operation for the screen to the back-end part 21. The back-end part 21, based on the information, performs update or the like for the result of virtually drawing of the content data of the Web application. The back-end part 21 reports a result of update to the front-end part 123b. As a result, on the image forming apparatus 10b, display content on the screen is updated. In this way, in the embodiment, by the back-end part 21 and the front-end part 123b, the incompatibility with the Web application in the image forming apparatus 10b will be removed.

Figure 5A:
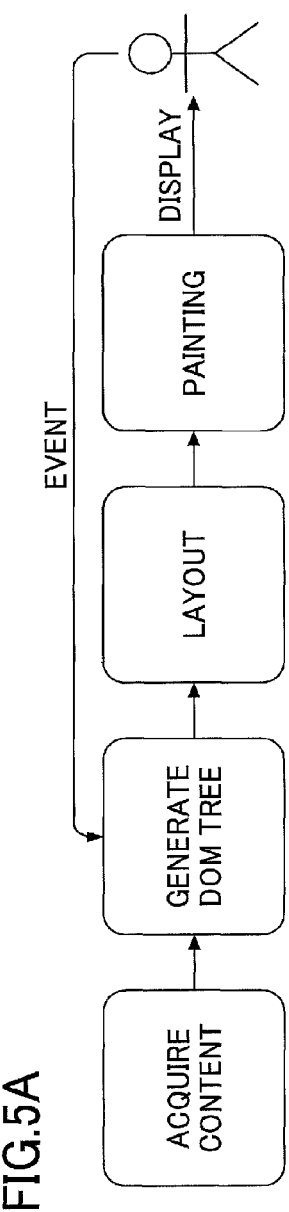
FIGS. 5A and 5B are diagrams for explaining a virtual drawing procedure for content data of a Web application in a back-end part.
Figure 5B:
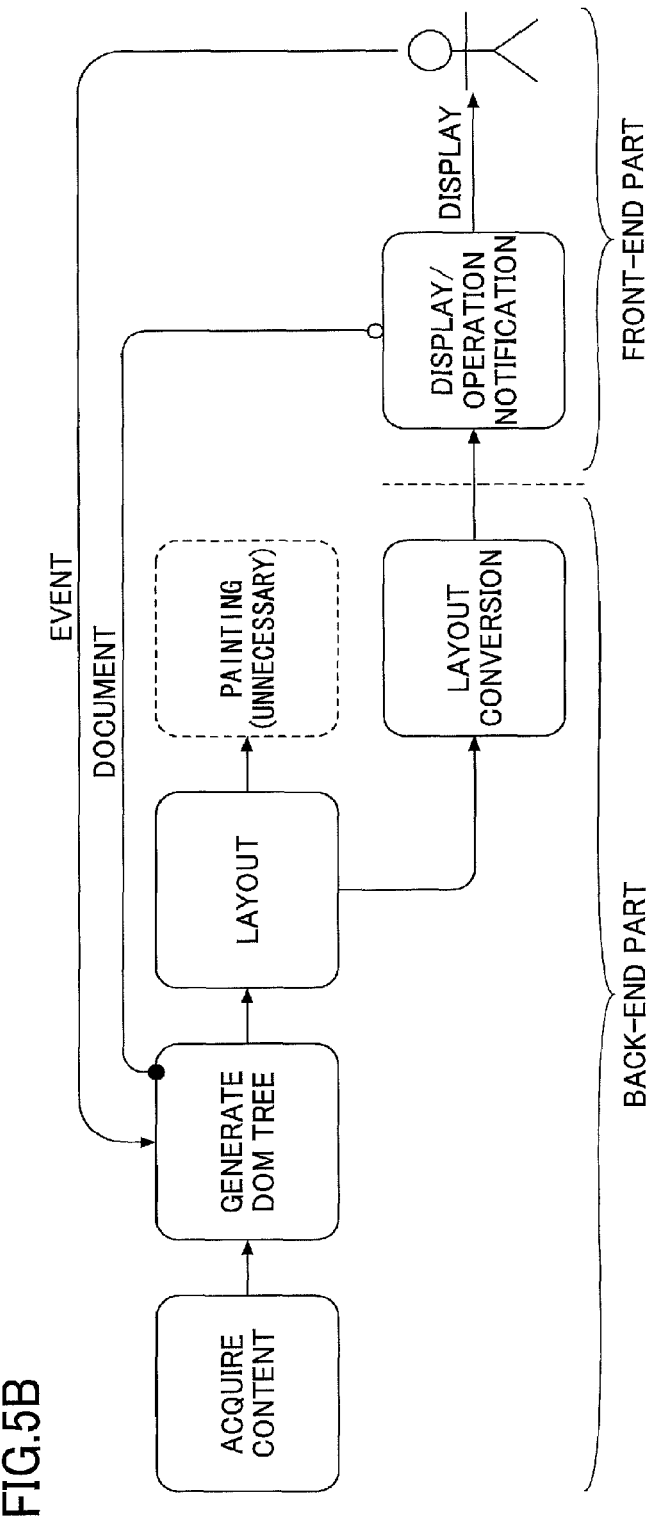

Subsequently, a procedure of virtually drawing the content data of the Web application in the back-end part 21 will be described. FIGS. 5A and 5B are diagrams for explaining the virtual drawing procedure for the content data of the Web application in the back-end part 21.

FIG. 5A illustrates a drawing procedure for the content data of the Web application by the browser unit 122a. The drawing procedure includes acquiring content data, generating a DOM (Document Object Model) tree, laying out, performing painting and the like.

A step of acquiring content data is a process of acquiring (downloading) content data (HTML, CSS, script and the like) of a Web application from the server apparatus 50 by HTTP (HyperText Transfer Protocol) communication.

A step of generating a DOM tree is a process of analyzing tags of HTML data among the acquired content data, and generating a DOM tree. Moreover, in the step of generating the DOM tree, CSS data are analyzed and information regarding decoration necessary for displaying the screen is generated.

A step of laying out is a process of determining positions of respective DOM elements of the DOM tree.

A step of performing painting is a process of performing drawing of the screen (displaying) based on the DOM tree. After initial drawing is completed, at the moment of an event such as (A) to (C), as follows, the DOM tree is updated and drawing content is updated:
(A) updating style of DOM element by a script;
(B) adding or removing DOM element by a script; and
(C) user's operation.

FIG. 5B illustrates a procedure of virtually drawing the content data of the Web application by the back-end part 21. The drawing procedure, in the same way as FIG. 5A, includes acquiring content data, generating a DOM tree, and laying out, but does not include performing painting. That is, displaying the screen is not actually performed (However, displaying the screen may be performed). On the other hand, in FIG. 5B, a layout conversion is performed.

In the layout conversion, regarding the DOM tree, a conversion into data, which has a format interpretable by the front-end part 123b, and with which a screen of the Web application can be displayed (in the following referred to as "screen layout data"), is performed. The back-end part 21 provides screen layout data generated by the layout conversion to the front-end part 123b. In this way, in the back-end part, most of the drawing procedure executed by the browser unit 122a is executed.

The front-end part 123b displays a screen of a Web application based on the screen layout data provided from the back-end part 21. Moreover, the front-end part 123b reports information indicating an operation for the screen (in the following, referred to as "operation information") to the back-end part 21. The back-end part 21, based on the operation information, updates the DOM tree. Therefore, the format of the screen layout data is not limited to the predetermined one, if the front- and part 123b can display the screen of the Web application, and, in response to an operation for the screen, the operation information including identification information or the like of the DOM element corresponding to an operated display element can be reported to the back-end part 21. Moreover, the screen layout data may not include information defined by the script, i.e. information indicating a process to be executed in response to the operation for the screen. The screen layout data may be different for the respective models of the image forming apparatus 10.

In order to realize the drawing procedure as shown in FIGS. 5A and 5B, the back-end part 21 and the front-end part 123b are provided with functional configurations as shown in FIG. 6.

FIG. 6 is a diagram depicting an example functional configuration of the back-end part and a front-end part according to the first embodiment. In FIG. 6, the back-end part 21 includes a connection management unit 211, a browser unit 212, a browser control unit 213, a layout conversion unit 214, an operation information reception unit 215, a device service mediating unit 216 and the like. The respective units are enabled by a process in which one or more programs installed in the external browser apparatus 20 are executed by the CPU 204. Moreover, the back-end part 21 uses a connection information storage unit 221, a bookmark storage unit 222, a panel information storage unit 223, an operation specification storage unit 224 and the like. The respective storage units can be realized by using the auxiliary storage device 202, a storage device which can be connected to the external browser apparatus 20 via a network, or the like.

The connection management unit 211 manages a connection relation between the front-end part 123b and the browser unit 212. That is, a process of the browser unit 212 is started for each of the front-end part 123b. This is because drawing content by the browser unit 212 is different for each front-end part 123b. Information indicating the connection relation between the front-end part 123b and the browser unit 212 is stored in the connection information storage unit 221.

The browser unit 212 functions as the Web browser of the same kind as the browser unit 122a of the image forming apparatus 10a. That is, the browser unit 212 can interpret content data that the browser unit 122a can interpret, and executes the steps from acquiring content data to laying out in the drawing procedure shown in FIG. 5B. In the drawing procedure, the browser unit 212 generates a screen corresponding to the operation panel 15 of the image forming apparatus 10*b*. For example, the browser unit 212 draws a screen so as to fall within a range of a display region of the operation panel 15 of the image forming apparatus 10*b*. A URL of the content data of the Web application that the browser unit 212 acquires is stored in the bookmark storage unit 222. Moreover, information regarding the operation panel 15 of the image forming apparatus 10*b* is stored in the panel information storage unit 223, the operation specification storage unit 224, and the like.

The browser control unit 213 outputs the DOM tree generated by the browser unit 212 to the layout conversion unit 214, and inputs an event that the operation information received by the operation information reception unit 215 indicates to the browser unit 212.

The layout conversion unit 214 executes a step of layout conversion in the drawing procedure shown in FIG. 5B. The layout conversion unit 214 sends screen layout data generated by the conversion to the front-end part 123*b*.

The operation information reception unit 215 receives information indicating an operation for the screen displayed based on the screen layout data in the front-end part 123*b*, and converts the operation information into event information that the browser unit 212 can interpret.

The device service mediating unit 216 functions as an emulator for the device service unit 121*a*. Because the device service mediating unit 216 functions as an emulator for the device service unit 121*a*, the browser 212 can input to the device service mediating unit 216 a processing instruction for the image forming apparatus 10*b* via an interface, which the browser unit 122*a* uses and which is the same as the interface provided by the device service unit 121*a*. The device service mediating unit 216 accepts, for example, an execution instruction of the processing for the image forming apparatus 10 outputted from the browser unit 212 based on a definition of a script, and sends the execution instruction of the processing to a device service disclosure unit 134 of the front-end part 123*b*.

In contrast, the front-end part 123*b* includes a usage request unit 131, a layout reception unit 132, an operation information transmission unit 133, the device service disclosure unit 134 and the like. The respective units are enabled by a process in which one or more programs installed in the image forming apparatus 10*b* are executed by the CPU 111 of the image forming apparatus 10*b*. Moreover, the front-end part 123*b* uses a back-end information storage unit 135. The back-end information storage unit 135 can be realized, for example, by using the HDD 114 of the image forming apparatus 10*b* or the like.

The usage request unit 131 sends a request for using the back-end part 21 to the back-end part 21. Identification information of the back-end part 21, which is the transmission destination of the usage request is stored in the back-end information storage unit 135. The layout reception unit 132 receives screen layout data sent from the layout conversion unit 214 of the back-end part 21, and displays a screen based on the screen layout data on the operation panel 15. The operation information transmission unit 133 sends operation information indicating an operation for the screen displayed by the layout reception unit 132 to the back-end part 21. The operation information includes information indicating identification information of the display element, which is an object of operation, a category of operation, or the like. The device service disclosure unit 134 discloses an interface (API) that makes the function of the device service unit 121*b* capable of being called via a network.

In the following, a process performed by the image forming apparatus 10 and the external browser apparatus 20 will be described. In the embodiments, as a schematic example of the Web application, a Web application for providing a service called "cloud pull print" will be used. The name of "cloud pull print" is an expedient one, and content of the service will not be limited by the name.

FIG. 7 is a diagram for explaining schematically the cloud pull print. A user logs in, for example, from a PC 30 to the server apparatus 50, and uploads a file (in the following, referred to as "data file") including actual data of a document stored in the PC 30 to the server apparatus 50 (step S1). Subsequently, the user moves to any of the image forming apparatuses 10 (step S2), and logs in to the image forming apparatus 10 (step S3). In response to the login or when a usage of a cloud pull print service is instructed by the user after the login, the image forming apparatus 10 acquires (downloads) a list of documents uploaded to the server apparatus 50, and displays the list on the operation panel 15. When a document that is an object of printing is selected from the list by the user, the image forming apparatus 10 acquires (downloads) a data file of the document from the server apparatus 50 (step S5) and performs printing (step S6).

According to the cloud pull printing, for example, a user can cause an image forming apparatus 10 installed in an office to print a document stored in a PC, a mobile terminal or the like without passing through a corporate LAN of a company to which the user belongs. For example, the user can upload a document that is an object of printing from home or a visiting destination.

A user who uploads a document may not be a user who causes the image forming apparatus 10 to print the document. For example, when a user B has access authority for a document that a user A uploads, the user B may instruct to print.

FIG. 8 is a diagram for explaining an example process executed regardless of compatibility with a Web application regarding the cloud pull print. That is, FIG. 8 shows a process which is commonly executed, regardless of whether an output destination is the image forming apparatus 10*a* or the image forming apparatus 10*b*. In FIG. 8, an example where the user A uploads a document using the PC 30 and the user A instructs to print the document will be described. However, the print instruction may be performed by a user other than the user A. Moreover, in the following, the image forming apparatus that the user A operates will be referred to as an "object device".

As an initial state, a login screen is displayed on the PC 30 to the server apparatus 50. The login screen may be displayed, for example, based on a Web page downloaded from the server apparatus 50. In FIG. 8, for example, a Web browser of the PC 30 may cause the PC 30 to execute the process that the PC 30 executes.

When the user A inputs a user ID and a password to the login screen displayed on the PC 30, the PC 30 sends a login request including the user ID and the password to the server apparatus 50 (step S101). The authentication unit 51 of the server apparatus 50 performs an authentication process for the user ID and the password included in the login request (step S102).

When the authentication is not successful, subsequent processes are aborted. When the authentication is successful, the authentication unit 51 generates a ticket (cookie) indicating that the login is successful, and returns the ticket and a Web page for displaying an upload screen to the PC 30. In the server apparatus 50, the ticket is stored in association with the user ID of the authenticated user. Moreover, a request from the PC 30 in the subsequent steps includes the ticket. Therefore, the server apparatus 50 can specify user IDs related to requests from the respective PCs 30, based on the tickets included in the requests.

The upload screen is a screen for causing a document that is an object of uploading, a destination of the document, or the like to be selected. The destination of the document is a user or a group which is allowed to access the document. The group is, for example, an aggregate of users, such as a department.

The PC 30, which receives the Web page, displays the upload screen. When the document is an object of uploading, the destination of the document or the like is selected by the user A via the upload screen, the PC 30 sends (uploads) a data file or the like of the document to the server apparatus 50 (step S103). The document management unit 52 of the server apparatus 50, upon receiving the data file, causes, for example, the auxiliary storage device 202 to store the data file, and the document information storage unit 54 to store bibliographic information of document related to the data file (step S104).

FIG. 9 is a diagram depicting an example design of the document information storage unit 54. In FIG. 9, the document information storage unit 54 stores bibliographic information including a document ID, a category of document, a URI, a number of pages, a size, date and time, a creator, a format, a destination and the like, for each uploaded document.

The document ID is identification information for each document. The category of document is a category of a document when the respective documents are classified from a viewpoint of business of the user, such as a report or a slip. The URI is information indicating where the data file of the document is stored in the server apparatus 50, and a file name is indicated at the end of the URI. The size is a data size of the data file. The date and time is a date and time when the document is uploaded, i.e. a date and time when the document is received by the document management unit 52. As long as it is information indicating when the document is uploaded, information other than the date and time may be used instead of the date and time. The creator is a user ID of a user who uploads the document, i.e. a user ID of a login user related to an upload request for the document. The format is a data format of the data file. The destination is a destination of the document. In other words, the destination is a user or a department which has an access authority for the document. When the destination is a department, the access authority is given to a user who belongs to the department.

The document ID is automatically allocated by the document management unit 52. The URI, the size, the date and time, the creator, and the format are automatically determined by the document management unit 52. The category of document and the destination are included in the upload request. For example, the category of document and the destination are specified by the user A on the upload screen.

Afterwards, when the user A passes an IC card over an IC card reader 18 of the object device (step S111), the object device returns from the energy-saving state (step S112). Subsequently, the device service unit 121 of the object device controls reading out of a card ID from the IC card (step S113). Subsequently, the device service unit 121 of the object device sends a login request including the card ID to the server apparatus 50 (step S114). The authentication unit 51 of the server apparatus 50 performs authentication processing for the card ID included in the login request (step S115). Specifically, if a record including the user ID is preliminarily stored in association with the card ID, it is determined that the authentication is successful. When the authentication is not successful, the subsequent processes are aborted. When the authentication is successful, the server apparatus 50 indicates that the authentication is successful, and returns a response including a user ID corresponding to the card ID to the object device. The device service unit 121 of the object device causes, for example, the RAM 112 to store the user ID included in the response as a user ID of the login user.

Subsequently, the device service unit 121 of the object device performs a process of acquiring priority setting application information related to the authenticated user A (step S116). The priority setting application is an application that is an object of operating first after the image forming apparatus 10 is activated (becomes an object of displaying first). The priority setting application is set for each user ID. The priority setting application information is information indicating the priority setting application. Next, the device service unit 121 starts the priority setting application based on the priority setting application information set for the user ID of the login user (step S117).

Subsequent processing is different for a case where the image forming apparatus 10a having compatibility with a Web application is the object device, and for a case where the image forming apparatus 10b which does not have compatibility with the Web application is the object device. Therefore, the respective cases will be described individually.

Figure 10:
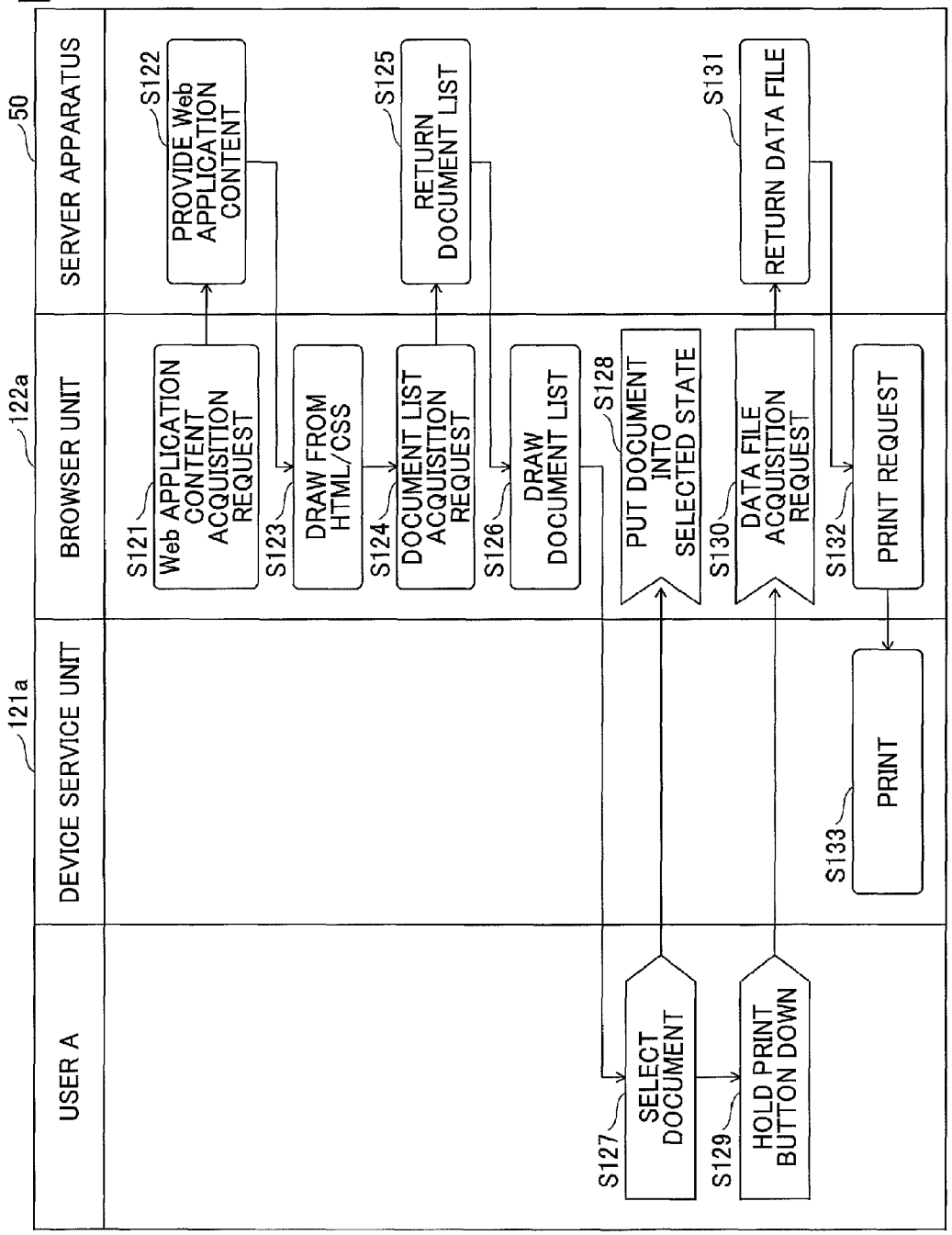
FIG. 10 is a diagram for explaining an example process that an information processing apparatus having compatibility with a Web application executes for a Web application of the cloud pull print.

FIG. 10 is a diagram for explaining an example process that an information processing apparatus having compatibility with a Web application executes for a Web application of the cloud pull print.

When the object device is the image forming apparatus 10a, the priority setting application information is a URL of a Web application corresponding to the cloud pull print. Then, the device service unit 121a specifies the URL and starts the browser unit 122a in step S117 of FIG. 8.

The browser unit 122a sends an acquisition request for content data of the Web application related to the URL (step S121) after starting. The server apparatus 50, in response to the acquisition request, returns the content data of the Web application of the cloud pull print (step S122). For example, HTML, CSS, the script and the like of the Web application are returned.

Next, the browser unit 122a, based on HTML and CSS included in the returned content data, performs a drawing process for a static part of a document list screen (step S123). The document list screen is a screen in which a list of documents uploaded to the server apparatus 50 is displayed.

Figure 11:
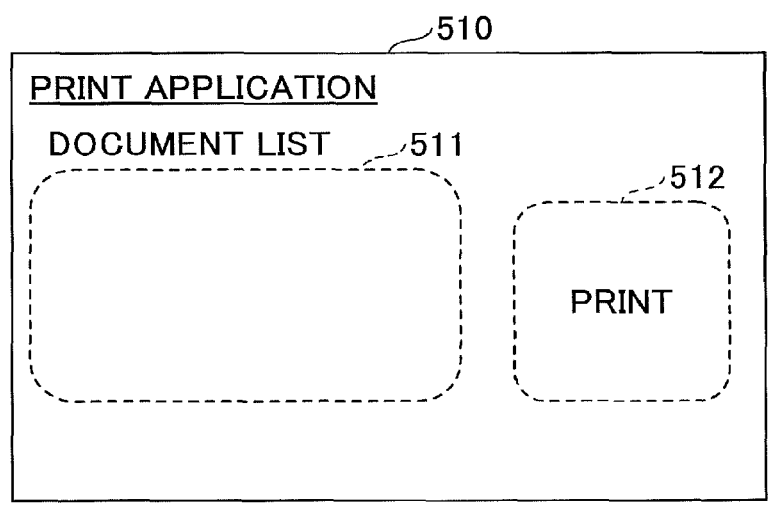
FIG. 11 is a diagram depicting an example static part of a document list screen.

FIG. 11 is a diagram depicting an example static part of the document list screen. In FIG. 11, the document list screen 510 includes a document list display region 511, a print button 512 and the like. The document list display region 511 is a region where a list of documents is displayed. But, FIG. 11 does not include the list of documents. This is because the list of documents is a dynamic part which varies depending on documents uploaded to the server apparatus 50. That is, the list of documents is a part that cannot be defined in advance as static content data of a Web application. The print button 512 is a button for accepting an instruction for printing a document selected on the document list display region 511. Because, in the state of FIG. 11, the list of documents is not displayed (i.e. a state where an instruction for printing a document cannot be accepted), the print button 512 is displayed in a gray out state, in which the print button 512 cannot be operated. That is, in FIG. 11, the print button 512 shown by a dashed line indicates that the print button is displayed in a gray out state, for example.

Figure 12:
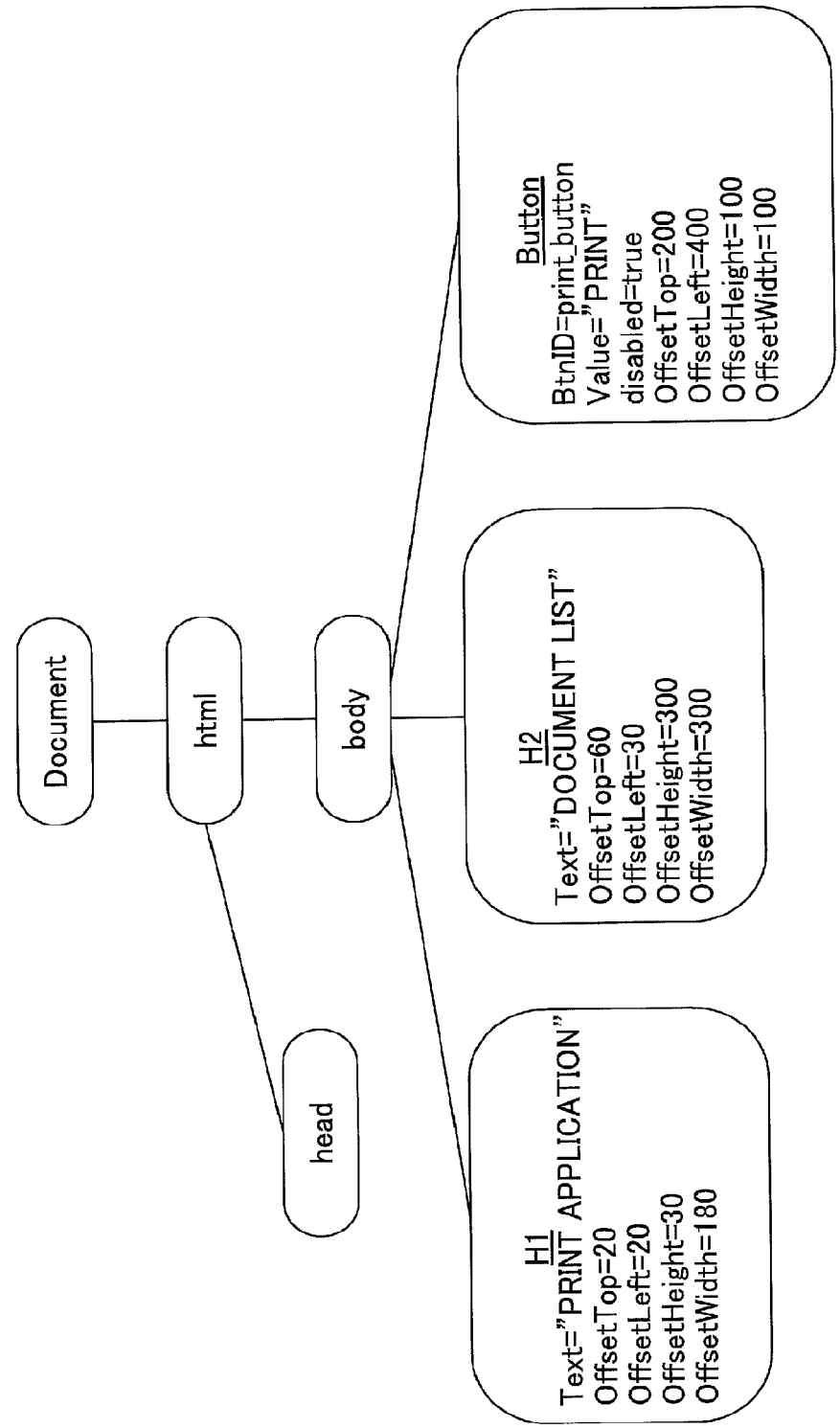
FIG. 12 is a diagram depicting an example DOM tree corresponding to the static part of the document list screen.

The document list screen 510 is generated, for example, based on a DOM tree, as shown in FIG. 12. In other words, the browser unit 122*a*, based on content data of a Web application, generates the DOM tree, as shown in FIG. 12, and draws the document list screen 510 based on the DOM tree.

FIG. 12 is a diagram depicting an example DOM tree corresponding to the static part of the document list screen. Respective nodes of the DOM tree indicate DOM elements. In FIG. 12, a "body" node is a DOM element corresponding to a body text of an HTML document. An H1 node and an H2 node are DOM elements corresponding to headings. The H1 node corresponds to a heading of "print application" and the H2 node corresponds to a heading of "list of documents". Levels of the heading include h1 level to h6 level, and the h1 level is the greatest heading. A "Button" node is a DOM element corresponding to the print button 512. In the "Button" node, a value of "disabled", which is an attribution indicating propriety of operating, is "true".

Here, to each of the H1 node, H2 node and the "Button" node, an attribution beginning with "Offset" is added. The attribution beginning with "Offset" is layout information indicating an arrangement position of a display element corresponding to each DOM element, and added in the layout shown in FIG. 5.

Subsequently, the browser 122*a* sends a request for acquiring a list of documents related to the user A, based on a script of the content data of the Web application of the cloud pull print (step S124). That is, the script includes a definition indicating that a list of documents related to a login user should be acquired upon displaying the Web application. The acquisition request includes a user ID of the login user. The document management unit 52 of the server apparatus 50, in response to the acquisition request, acquires, for example, bibliographic information of documents (hereinafter referred to as "document list"), destinations of which are the user ID included in the acquisition request, among the documents stored in the server apparatus 50, from the document information storage unit 54, and replies with data indicating the list (hereinafter referred to as "document list data") (step S125).

FIG. 13 is a diagram depicting an example document list data. FIG. 13 depicts an example where the document list is described in the JSON (JavaScript (trademark registered) Object Notation) format.

In FIG. 13, the document list data include values of "file", "page" and "DocID" for each document. "File" indicates a filename of a document. "Page" indicates a number of pages of the document. "DocID" indicates a document ID which is identification information of the document.

Subsequently, the browser part 122*a*, based on the script of the Web application of the cloud pull print and the acquired document list data, updates the DOM tree related to the document list screen 510, and performs a drawing process for the updated part (step S126). As a result, the DOM tree shown in FIG. 12 is updated as shown in FIG. 14.

Figure 14:
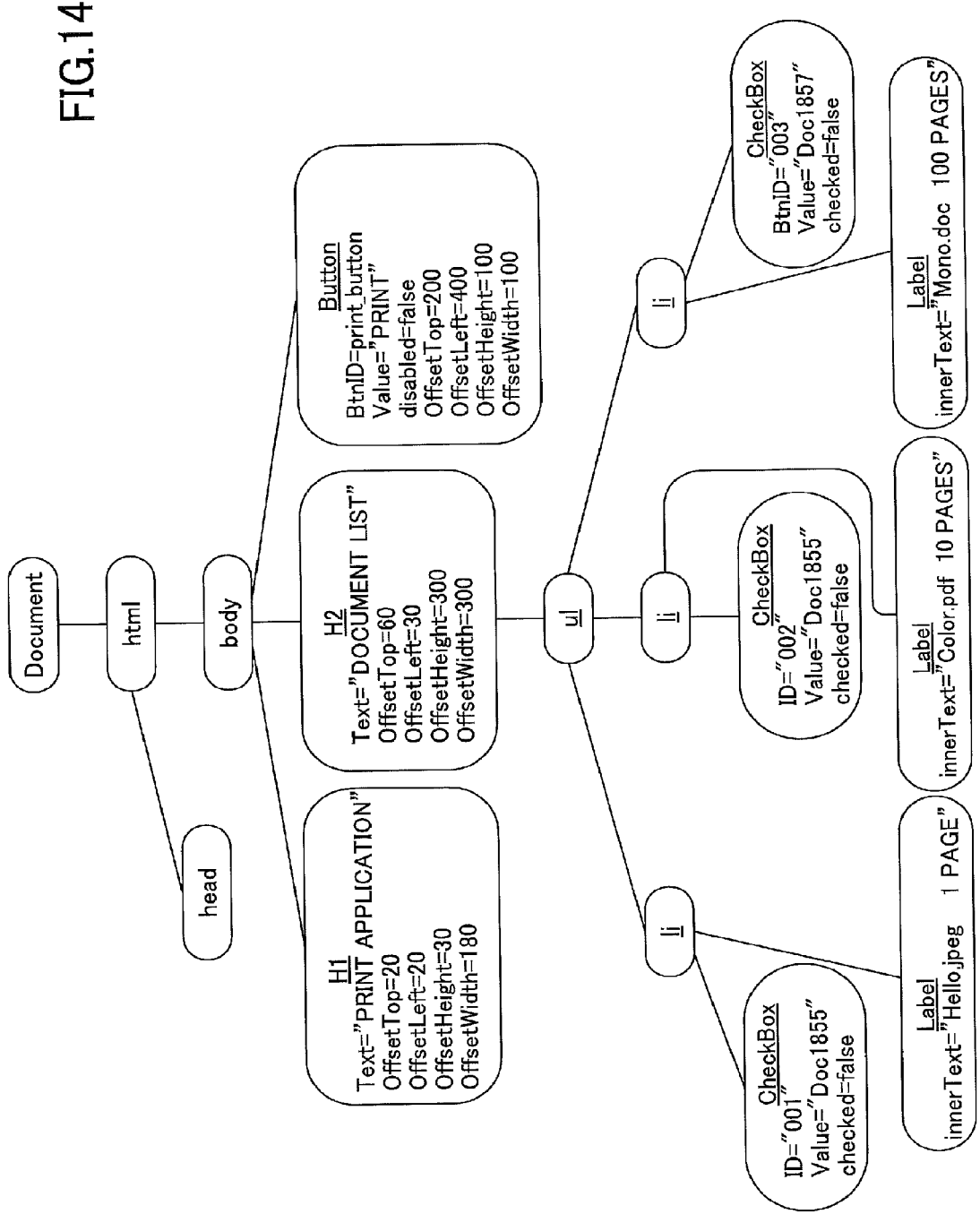
FIG. 14 is a diagram depicting an example DOM tree of the document list screen updated based on the document list data.

FIG. 14 is a diagram depicting an example DOM tree of the document list screen updated based on the document list data.

In FIG. 14, a "ul" node and subsequent nodes are added. The "ul" node means "Unordered List" (list without an order). Here, the unordered list is the document list. A "li" node which is a child node of the "ul" node means "List Item". Here, the respective documents included in the document list correspond to respective list items. Each "li" node has a "CheckBox" node and a "Label" node as child nodes. The "CheckBox" node means "Input.Chekbox", and has a "Checked" attribution indicating that a list item is selected or not selected. When the list item is selected, a value of the "Checked" attribution of the "CheckBox" node corresponding to the list item is "true". When a selection of a list item is released, the value of "Checked" attribution of a "CheckBox" node corresponding to the list item becomes "false". A value of an ID attribution of the "CheckBox" node is identification information for identifying a check box. When the DOM tree is generated, an arbitrary value is allocated to the value of the ID attribution. To a value of a "Value" attribution of the "CheckBox" node, a document ID of a document corresponding to the list item is set. A "Label" element has a character string displayed in the list item. Here, a character string including a filename and a number of pages is an object of displaying.

Figure 15:
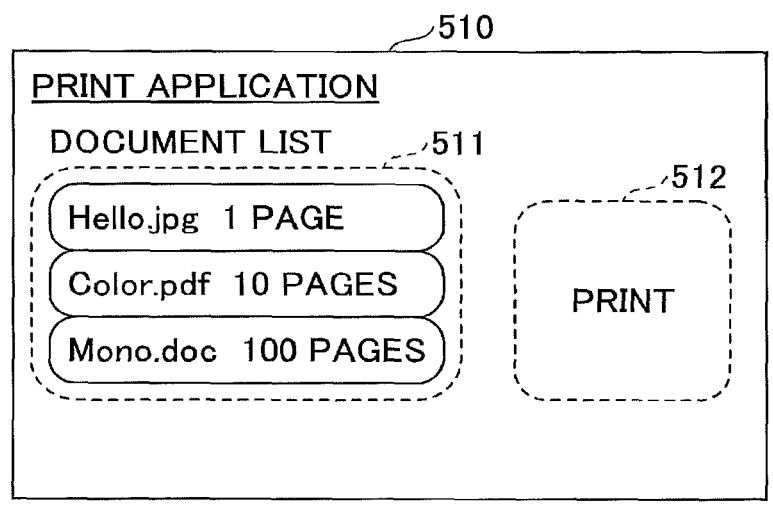
FIG. 15 is a diagram depicting an example document list screen in which a document list is drawn.

The DOM tree is updated, as shown in FIG. 14, and a drawing process is performed, and thereby the document list screen 510 is updated as shown in FIG. 15.

FIG. 15 is a diagram depicting an example document list screen in which a document list is drawn. As shown in FIG. 15, in a document list display region 511 of the document list screen 510, the document list is displayed.

Next, when one or more list items corresponding to documents that are objects of printing are selected among the list items included in the document list display region 511 by the user A, the browser 122*a* turns values of the "Checked" attribution of the "CheckBox" nodes corresponding to the selected list items in the DOM tree to "true", and values of "disabled" attribution of the "Button" nodes to "false" (step S127). As a result, a display state of the list items and the print button 512 is changed.

Figure 16:
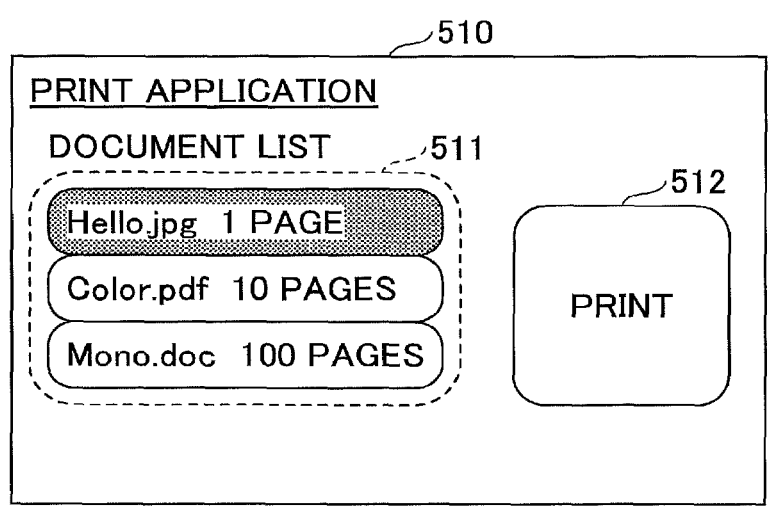
FIG. 16 is a diagram depicting a state where a document is selected.

FIG. 16 is a diagram depicting a state where a document is selected. FIG. 16 depicts an example where the first list item (i.e. a document with a filename "Hello.jpg") is selected. Moreover, in FIG. 16, the print button 512 is changed to an operable state.

Next, when the print button 512 is held down by the user A (step S129), the browser 122*a*, based on the script of the Web application of the cloud pull print, sends to the server apparatus 50 a request for acquiring a data file related to the selected document (step S130). The acquisition request includes a value of a "Value" attribution of a "CheckBox" node, in which a value of a "Checked" attribution is "true" (i.e. a document ID).

The document management unit 52 of the server apparatus 50 acquires the data file related to the document ID included in the acquisition request from, for example, the auxiliary storage device 202, and sends the acquired data file to the object device (step S131). The data file related to the document ID can be identified based on a URI which is stored in the document information storage unit 54 in association with the document ID. When a format of data stored in the data file is a format that cannot be printed in the object device, the data file may be returned after a conversion is performed for the data file into a format that can be printed in the object device.

The data file returned to the object device may not be limited to a file format. That is, the term "file" is used for the sake of convenience, and it is not intended to limit a data format of document to a file format.

In the object device, when the data file is received, the browser unit 122*a*, based on an execution instruction for printing defined in the script of the Web application of the cloud pull print, requests the device service unit 121*a* to print the data file (step S132). The device service unit 121*a*, in response to the request, performs a print job regarding the data file (step S133). As a result, the document selected by the user A in the document list screen 510 is printed.

Next, a process when the object device in FIG. 8 is the image forming apparatus 10*b* which does not have the compatibility with a Web application will be described.

Figure 17:
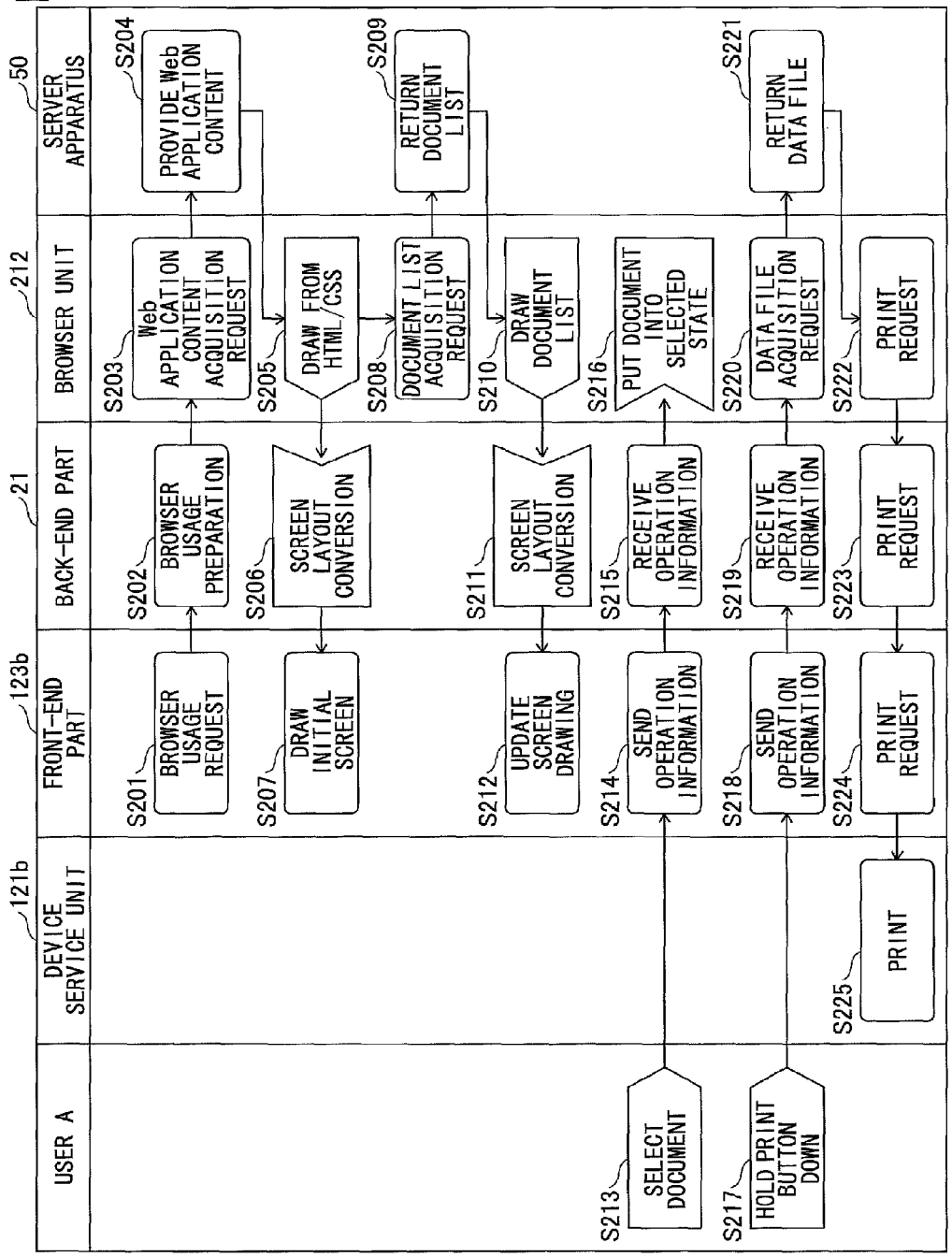
FIG. 17 is a diagram for explaining an example process that an information processing apparatus which does not have compatibility with a Web application executes for the Web application of the cloud pull print.

FIG. 17 is a diagram for explaining an example process that an information processing apparatus which does not have compatibility with a Web application executes for the Web application of the cloud pull print.

When the object device is the image forming apparatus 10*b*, the priority setting application information is information indicating the front-end part 123*b*. Then, the device service unit 121*b*, in step S117 in FIG. 8, starts the front-end part 123*b*. Subsequently, the usage request unit 131 of the front-end part 123*b* sends a usage request for a browser to the back-end part 21 (step S201). A destination of the usage request for a browser is identified with reference to the back-end information storage unit 135 of the image forming apparatus 10*b*.

FIG. 18 is a diagram depicting an example design of the back-end information storage unit. As shown in FIG. 18, the back-end information storage unit 135 stores a priority order, a location division, a URL and the like, for each back-end part 21 which is a candidate for a connection destination. The priority order is a priority order of the respective candidates. A candidate with lower priority order becomes a connection destination when a connection to a candidate with higher priority order is not successful. The location division is information indicating whether a location of each back-end part 21 is inside an intranet or on the Internet. The URL is a URL for each back-end part 21.

The usage request to the back-end part 21 in step S201 includes a user ID of a login user and identification information of a machine body of the image forming apparatus 10*b* (hereinafter, referred to as a "machine number"). Moreover, when the front-end part 123*b* is different for each device model or when front-end parts 123*b* of a plurality of versions exist, identification information indicating a category of the front-end part 123*b* may be included in the usage request.

The connection management unit 211 of the back-end part 21, which becomes the destination of the usage request for a browser, upon receiving the usage request, performs a preparation process for using the browser unit 212 (step S202). In the preparation process, with reference to the bookmark storage unit 222, a Web application to be acquired (downloaded) is identified.

FIG. 19 is a diagram depicting an example design of the bookmark storage unit. As shown in FIG. 19, the bookmark storage unit 222 stores, in association with a user ID that is identification information of a user, an application name of a Web application that the user can use, a URL, and information indicating whether the Web application is a priority setting application.

In the preparation process in step S202, with reference to the bookmark storage unit 222, a URL of a priority setting application corresponding to the user ID included in the usage request for browser is identified. The bookmark storage unit 222, shown in FIG. 19, stores that an application name of a priority setting application of the user A is "cloud pull print". The name "cloud pull print" is an application name for the cloud pull print. Therefore, an URL corresponding to the cloud pull print is identified.

A URL of a Web application may be included in a usage request for browser, and may be sent from the object device.

Moreover, in the preparation process in step S202, the panel information storage unit 223 and the operation specification storage unit 224 are referred to, and display performance, operability or the like of the operation panel 15 of the object device is identified.

FIG. 20 is a diagram depicting an example design of the panel information storage unit. As shown in FIG. 20, the panel information storage unit 223 stores values of items of a machine number, a machine name, a panel size, color representation, a pixel operation, a still image, a moving image, a font size, an operation method and the like for each machine body of the image forming apparatus 10.

The machine number is an identification number for a machine body of the image forming apparatus 10. The machine name is a name assigned to the machine body. The panel size is a size indicating a range of a liquid crystal panel (display region) in the operation panel 15. The color representation is a number of colors that can be represented on the liquid crystal panel. The pixel operation is information indicating whether a figure (vector data) can be drawn. The still image is information indicating whether a still image can be displayed. The moving image is information indicating whether moving images can be displayed. The font size is information indicating sizes of fonts that can be displayed. The operation method is information indicating an operation method for the liquid crystal panel.

Moreover, FIG. 21 is a diagram depicting an example design of the operation specification storage unit. As shown in FIG. 21, the operation specification storage unit 224 stores values of items of a touch event, a scroll, a swipe, a flick, a zoom and the like for each machine body of the image forming apparatus 10.

The touch event indicates an event of a touch that can be detected. The scroll, the swipe, the flick and the zoom indicate whether the respective operation can be performed. That is, the information stored in the operation specification storage unit 224 is an example of information indicating, for each machine body, an operation that can be accepted by the operation panel 15 of the machine body.

In addition, also information related to the object device stored in the panel information storage unit 223 or the operation specification storage unit 224 may be, for example, included in the usage request for browser and sent from the object device.

In the preparation process in step S202, the panel information storage unit 223 is referred to, and a process of the browser unit 212 (Web browser) is started with a window size corresponding to a panel size related to the object device. To the started browser unit 212, a font size corresponding to the object device is set. Moreover, when a moving image cannot be displayed, the browser unit 212 is set so as not to display a moving image. Furthermore, the URL of the Web application identified by referring the bookmark storage unit 222 is set to the browser unit 212.

In this state, the connection management unit 211 stores information for managing a connection relation between the front end part 123*b* and a back end part 21 in the connection information storage unit 221.

FIG. 22 is a diagram depicting an example design of the connection information storage unit. As shown in FIG. 22, the connection information storage unit 221 stores a user ID, a machine number, a browser ID, a Web application and the like, for each activation unit (process) of the browser unit 212. The user ID is a user ID of a user who uses the activation unit. The machine number is a machine number of an image forming apparatus 10 having a front-end part 123b corresponding to the activation unit. The browser ID is identification information of the activation unit. For example, the process ID may be used as the browser ID. The Web application is a URL of a Web application that is an object of drawing in the activation unit.

Next, the browser unit 212 sends an acquisition request for content data of a Web application related to the set URL to the server apparatus 50 (step S203). The Web application management unit 53 of the server apparatus 50, in response to the acquisition request, replies with content data of the web application of the cloud pull print (step S204). For example, HTML, CSS, script and the like of the Web application are supplied.

Subsequently, the browser unit 212, based on HTML and CSS included in the supplied content data, performs a drawing process for a static part of the document list screen, and reports a completion of the drawing process to the browser control unit 213 (step S205). In the drawing process, as described in FIG. 5, a painting is not performed. Therefore, the DOM tree shown in FIG. 12 is generated. Moreover, the browser unit 212 performs a drawing process of a screen of a Web application so as to fit within its own window size. Here, the window size corresponds to a size of the liquid crystal panel of the operation panel 15 of the object device. Therefore, arrangement positions of the respective DOM elements (respective display elements) in the DOM tree of the screen have values determined in a state where the screen is fitted within the liquid crystal panel.

When the browser control unit 213, which receives a report of completion of the drawing process, acquires the DOM tree (FIG. 12) from the browser unit 212 and inputs the DOM tree into the layout conversion unit 214, the layout conversion unit 214 converts the DOM tree into screen layout data corresponding to the object device (step S206). As described in FIG. 5, the format of the screen layout data is not limited to a predetermined one. The layout conversion unit 214 sends the screen layout data generated by the conversion to the front-end part 123b of the object device.

The layout reception unit 132 of the front-end part 123b of the object device, upon receiving the screen layout data, based on the screen layout data, displays the document list screen 510 of the initial state (step S207). The initial state means a state shown in FIG. 11.

Moreover, the browser unit 212, following step S205, based on the script of content data of the Web application of the cloud pull print, sends an acquisition request for a document list related to the user A to the server apparatus 50 (step S208). The acquisition request includes the user ID which is included in the usage request for browser. The document management unit 52 of the server apparatus 50, in response to the acquisition request, in the same way as step S125 of FIG. 10, replies with the document list data (step S209). Contents of the document list data are as shown in FIG. 13, for example.

Subsequently, the browser unit 212, based on the script of the Web application of the cloud pull print and the acquired document list data, updates the DOM tree related to the document list screen 510, and performs a drawing process for the updated part (step S210). As a result, the DOM tree shown in FIG. 12 is updated as shown in FIG. 14. The browser unit 212 reports the completion of the drawing to the browser control unit 213.

However, depending on the number of documents included in the document list, some documents may be beyond the document list display region 511. In this case, when the object device cannot scroll to the document that is an object of displaying by an operation of sliding a finger on a touch screen (touch operation such as swipe/flick), a display element for accepting a scroll operation may be added to the document list screen 510.

Figure 23:
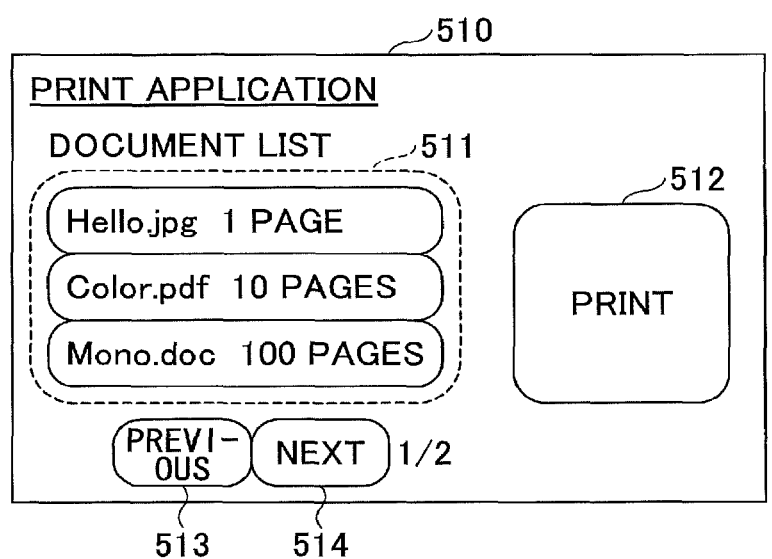
FIG. 23 is a diagram depicting an example document list screen, to which a display element for accepting a scroll operation is added.

FIG. 23 is a diagram depicting an example document list screen, to which a display element for accepting a scroll operation is added. The document list screen 510, shown in FIG. 23, further includes a "previous" button 513, a "next" button 514 and the like. These buttons are buttons for moving the document that is an object of displaying forward and backward. When these buttons are added, the browser unit 212 only has to add a DOM element corresponding to these buttons to the DOM tree. It may be determined whether the object device can accept an operation such as a swipe, with reference to the operation specification storage unit 224 (FIG. 21).

Subsequently, when the browser control unit 213 acquires the DOM tree (FIG. 14) from the browser unit 212 and inputs the DOM tree into the layout conversion unit 214, the layout conversion unit 214 converts the DOM tree into screen layout data (step S211). When the front-end part 123b can accept the screen layout data only of an updated part, only the updated part of the DOM tree may be the object of conversion. The layout conversion unit 214 sends the screen layout data generated by the conversion to the front-end part 123b of the object device.

The layout reception unit 132 of the front-end part 123b of the object device, upon receiving the screen layout data, based on the screen layout data, updates the document list screen 510 (step S212). That is, a display state of the document list screen 510 is updated as shown in FIG. 15.

Next, when a list item corresponding to a document that is an object of printing among the list items included in the document list display region 511 is selected by the user A (step S213), the operation information transmission unit 133 of the front-end part 123b of the object device sends identification information corresponding to the list item and operation information including information indicating that the list item is selected to the back-end part 21 (step S214). For example, as shown in FIG. 16, a list item related to a document with a file name of "Hello.jpg" is selected, a document ID "Doc1855", which is a document ID associated with the list item, is sent to the back-end part. In this way, the screen layout data provided to the front-end part 123b are required to include, for each display element that is an object of displaying, identification information of the display element. For example, in the case of a list item, a value of the "Value" attribution for the list item is required to be included in the screen layout data.

The operation information reception unit 215 of the back-end part 21, upon receiving the operation information, generates event information corresponding to the operation information and having a format that the browser unit 212 can interpret. The browser control unit 213 inputs the event information into the browser unit 212 (step S215). As a result, when a list item related to the document which is "Hello.jpg" is selected, an event, which is similar to the event detected by the browser unit 122a of the image forming apparatus 10a, is detected by the browser unit 212. The browser unit 21, in response to the detection of the event, in the DOM tree, changes the value of the "Checked" attribution of the "CheckBox" node corresponding to the list item, which is an object of selection in the event, to "true" (step S216). Screen layout data corresponding to the update of the value of the "CheckBox" node are sent to the front-end part 123b. The layout reception unit 132 of the front-end part 123*b*, based on the screen layout data, changes the display state of the selected list item, as shown in FIG. 16.

Subsequently, the print button 512 is held down by a user (step S217), the operation information transmission unit 133 of the front-end part 123*b* of the object device sends operation information indicating that the print button 512 is held down to the back-end part 21 (step S218). The operation information reception unit 215 of the back-end part 21, upon receiving the operation information, generates event information with a format that the browser unit 212 can interpret corresponding to the operation information. The browser control unit 213 inputs the event information into the browser unit 212 (step S219). As a result, an event which is the same as the event detected by the browser unit 122*a* of the image forming apparatus 10*a* when the print button 512 is held down is detected by the browser unit 212. The browser unit 212, in response to the event, based on the script of the Web application of the cloud pull print, sends an acquisition request for a data file related to the selected document to the server apparatus 50 (step S220). The acquisition request includes a value of the "Value" attribution of the "CheckBox" node where the value of the "Checked" attribution is "true" (i.e. document ID).

The document management unit 52 of the server apparatus 50 acquires a data file related to the document ID included in the acquisition request, for example, from the auxiliary storage device 202, and returns the acquired data file to the browser unit 212 (step S212). The data file returned to the object device may not be limited to the file format.

The browser unit 212, when the data file is received, requires the device service mediating unit 216 of the back-end part 21 to print the data file based on the execution instruction for printing defined in the script of the Web application of the cloud pull print (step S222). For the browser unit 212, the device service mediating unit 216 can be seen in the same way as the device service unit 121*a* for the browser unit 122*a*. That is, the device service mediating unit 216 emulates the device service unit 121*a*, and provides the same interface as the device service unit 121*a* to the browser unit 212. Therefore, the browser unit 212 can perform the print request by the same processing as in the case of operating in the image forming apparatus 10*a*.

Subsequently, the device service mediating unit 216 sends a print request for the data file to the device service disclosure unit 134 of the front-end part 123*b* of the object device (step S223). The device service disclosure unit 134 of the front-end part 123*b* of the object device, when receiving the print request, requires the device service unit 121*b* to print the data file (step S224). The device service unit 121*b*, in response to the request, executes a print job related to the data file (step S225). As a result, the document selected by the user A from the document list screen 510 is printed.

As described above, according to the embodiment, by the external browser apparatus 20, a definition content of a Web application is analyzed, and data for displaying a screen of the Web application is generated with a format that can be interpreted by the image forming apparatus 10*b*. Therefore, the incompatibility for the Web application in the image forming apparatus 10*b* can be removed. That is, even when a user operates the image forming apparatus 10*b*, the Web application can be used.

In the above description, the Web application for the cloud pull print has been described. However, the range to which the embodiments of the present invention can be applied is not limited to the Web application for the specific service.

For example, the embodiments can be applied to a Web application corresponding to a service (hereinafter, referred to as a "cloud scan") where when the image forming apparatus 10 is instructed to scan, image data read out from a document (hereinafter, referred to as a "scan image") is automatically uploaded to the server apparatus 50 or the like.

Figure 24:
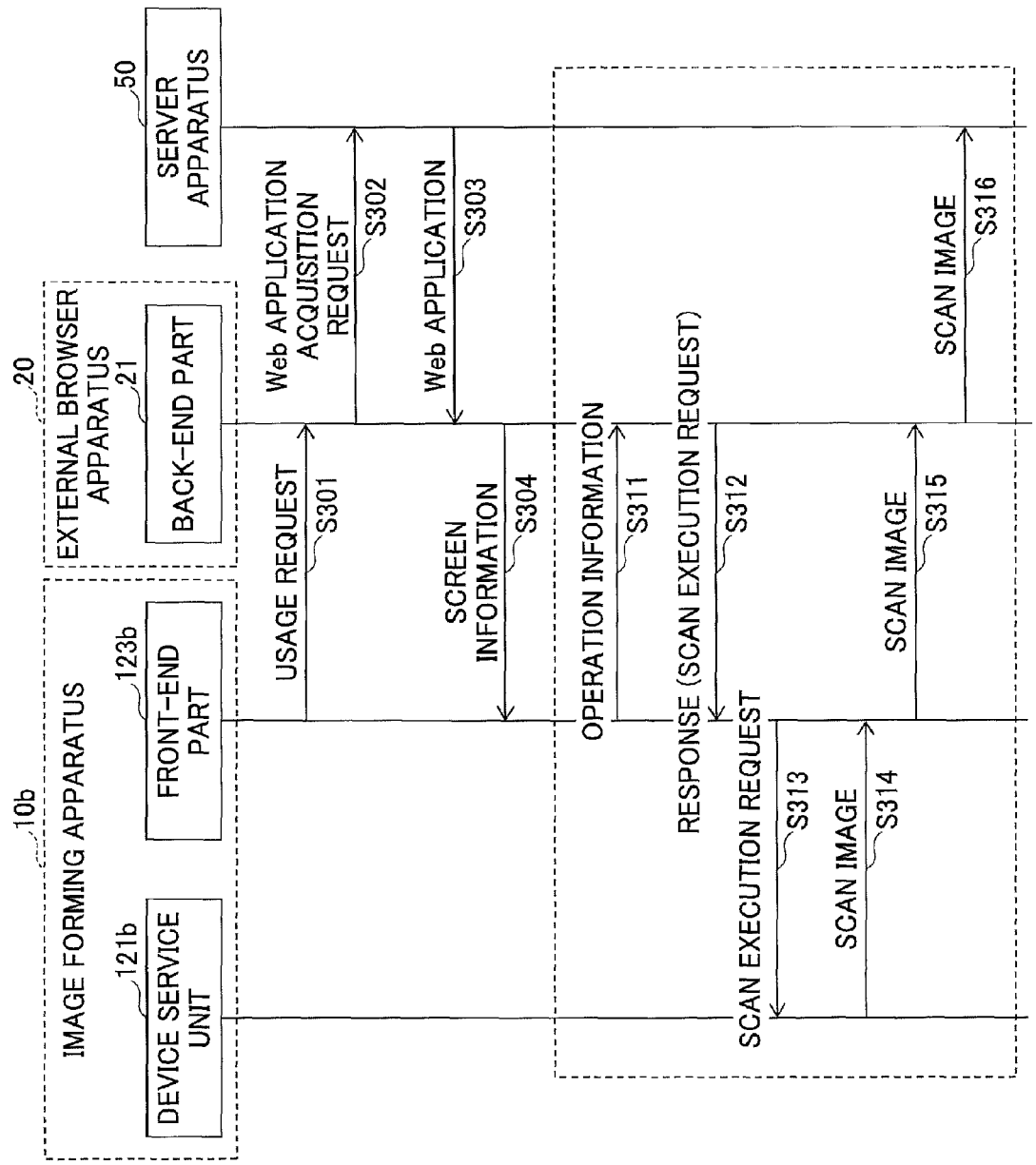
FIG. 24 is a diagram for explaining a first example process executed regarding a cloud scan.

FIG. 24 is a diagram for explaining a first example process executed regarding the cloud scan.

The usage request unit of the front-end part 123*b* sends a usage request for browser to the back-end part 21 (step S301). The connection management unit 211 of the back-end part 21, in response to the usage request, performs a preparation process. Here, the Web application regarding the cloud scan is an object of acquiring. Then, the browser unit 212 sends an acquisition request for content data of the Web application to a URL corresponding to the Web application (step S302). When the content data are received from the server apparatus 50 (step S303), the browser unit 212 executes the drawing process described in FIG. 5B. As a result, a DOM tree regarding the Web application is generated. The DOM tree is converted by the layout conversion unit 214 into screen layout data, and sent to the front-end part 123*b* (step S304). The layout reception unit 132 of the front-end part 123*b*, when receiving the screen layout data, displays a screen corresponding to the Web application of the cloud scan on the operation panel 15 based on the screen layout data. In the screen, for example, a button for accepting an execution instruction for scanning (hereinafter, referred to as a "scan start button") is arranged.

When a document is set on the image forming apparatus 10*b* and the scan start button is held down, the operation information transmission unit 133 sends operation information indicating that the scan start button is held down to the back-end part 21 (step S311). Subsequently, an event corresponding to the operation information is input to the browser unit 212 of the back-end part 21. The browser unit 212 requires the device service mediating unit 216 to execute scanning, based on the execution instruction of the scan defined in the script of the Web application of the cloud scan. The device service mediating unit 216, in response to the request, sends the execution request for scanning to the front-end part 123*b* (step S312). When the communication between the front-end part 123*b* and the back-end part 21 is performed by HTTP (HyperText Transfer Protocol), the operation information in step S311 may be an HTTP request, and the execution request of scanning in step S312 may be an HTTP response to the HTTP request. These features are the same also regarding the cloud pull print.

The device service disclosure unit 134 of the front-end part 123*b*, in response to the execution request of scanning, requires the device service unit 121*b* to execute the scanning (step S313). The request is, for example, performed by a function call or the like. The device service unit 121*b* controls the image forming apparatus 10*b*, and causes the image forming apparatus 10*b* to execute scanning of a document. The device service unit 121*b* outputs a scan image obtained by scanning the document to the device service disclosure unit 134. The device service disclosure unit 134 sends the scan image to the device service mediating unit 216 of the back-end part 21 (step S315). The device service mediating unit 216 sends the scan image to a predetermined folder in the server apparatus 50 (step S316).

Figure 25:
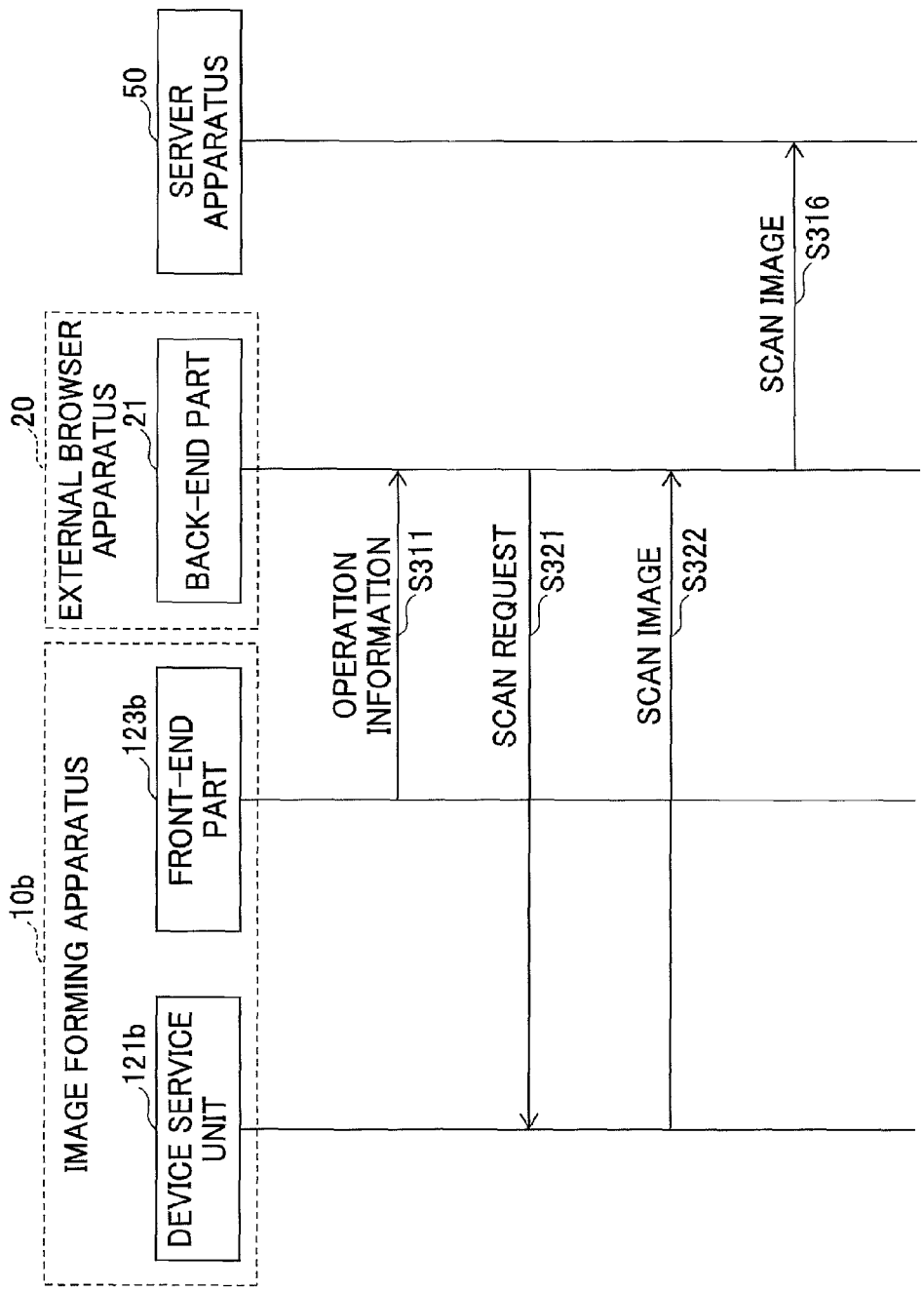
FIG. 25 is a diagram for explaining a second example process executed regarding the cloud scan.
Figure 26:
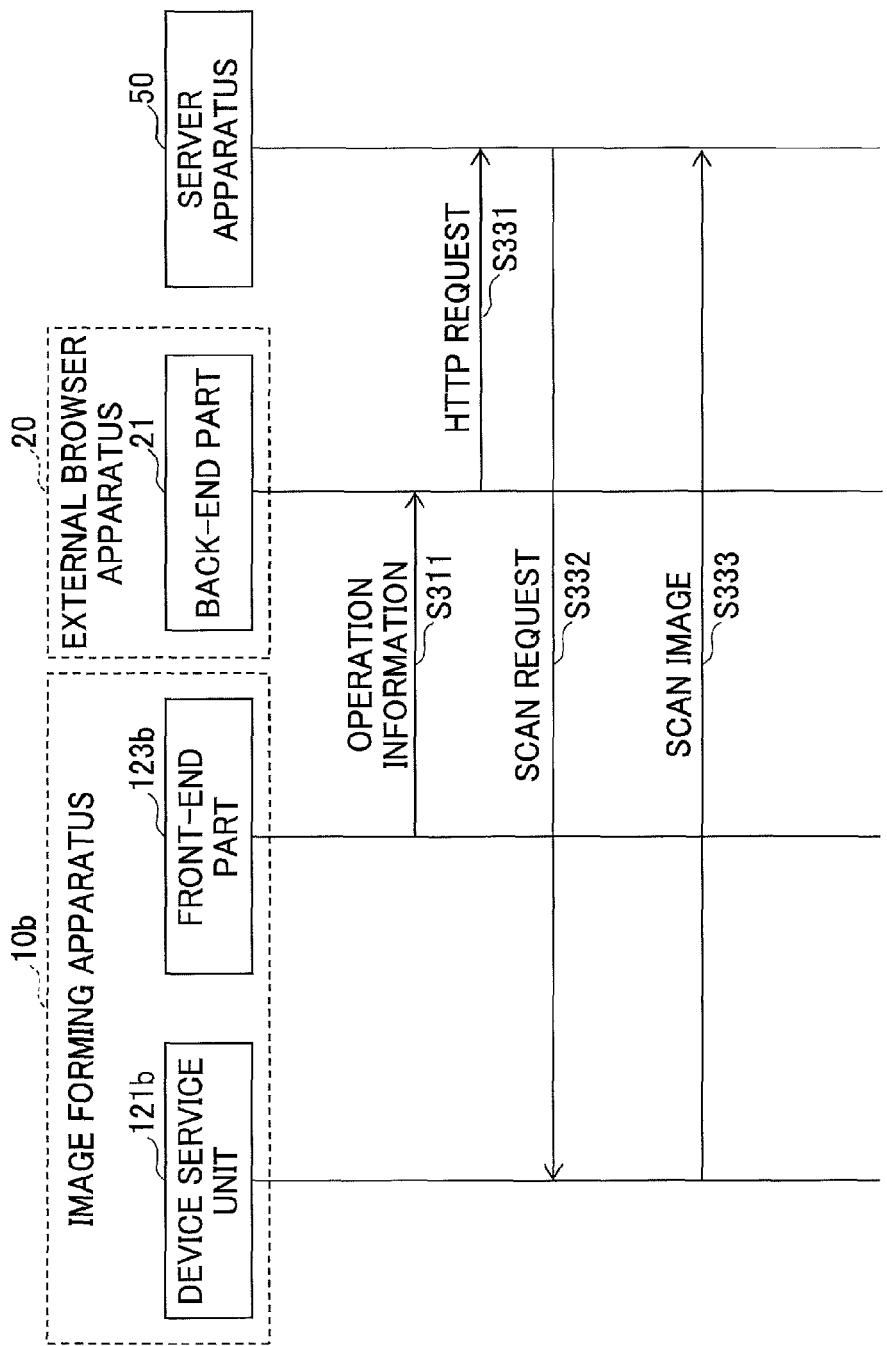
FIG. 26 is a diagram for explaining a third example process executed regarding the cloud scan.

In FIG. 24, a process surrounded by dashed lines may be replaced as shown in FIG. 25 or 26.

FIG. 25 is a diagram for explaining a second example process executed regarding the cloud scan. In FIG. 25, the same step number is assigned to the same step as in FIG. 24, and an explanation thereof will be omitted.

In FIG. 25, a process executed by the back-end part 21 in response to the operation information in step S311 is different from that of FIG. 24. Specifically, the browser unit 212, in response to an input of an event corresponding to the operation information, requires the device service mediating unit 216 to execute scanning, based on the execution instruction of the scanning defined in the script of the Web application of the cloud scan. The device service mediating unit 216, in response to the request, sends the execution request of scanning to the device service unit 121 of the image forming apparatus 10b (step S321).

That is, FIG. 25 is an example that is effective when the API of the device service unit 121, for example, as a Web API, can be called via a network. The Web API is an API, in which each method is distinguished by a URL.

The device service unit 121b, when receiving the execution request of scanning, controls the image forming apparatus 10b, and causes the image forming apparatus 10b to execute scanning of a document. The device service unit 121b sends (replies) a scan image obtained by scanning the document to the device service mediating unit 216 of the back-end part 21 (step S322). The device service mediating unit 216 sends the scan image to a predetermined folder in the server apparatus 50 (step S316).

Moreover, FIG. 26 is a diagram for explaining a third example process executed regarding the cloud scan. In FIG. 26, the same step number is assigned to the same step as in FIG. 24, and an explanation thereof will be omitted.

In FIG. 25, a process executed by the back-end part 21 in response to the operation information in step S311 is different from FIG. 24. Specifically, the browser unit 212, in response to an input of an event corresponding to the operation information, sends an HTTP request indicating an execution request of scanning to the server apparatus 50 based on a definition of HTML in the Web application (step S331). That is, in the third example, the definition of HTML in the Web application is different from the first example and the second example. In HTML, as a process in response to pressing the scan start button down, transmission of an HTTP request indicating an execution request of scanning to the server apparatus 50 is defined. Such definition is possible without using a script. Therefore, in the third example, content data of the Web application may not include a script. However, the HTTP request in step S331 may be executed based on a definition of a script. The HTTP request in step S331 corresponds to a transmission request of an execution instruction for a process to the image forming apparatus 10b.

The server apparatus 50, in response to the HTTP request, sends the execution request of scanning to the device service unit 121 of the image forming apparatus 10b (step S332). That is, the third example, in the same way as the second example (FIG. 25), is also an example that is effective when the API of the device service unit 121, for example, as a Web API, can be called via a network. A method of the device service unit 121 called in step S332 may be the same as the method called in step S321.

The device service unit 121b, when receiving the execution request of scanning, controls the image forming apparatus 10b, and causes the image forming apparatus 10b to execute the scanning of a document. The device service unit 121b sends (supplies) a scan image obtained by scanning the document to the service apparatus 50 (step S333), and the server apparatus 50 stores the scan image in a predetermined folder.

In this way, regarding the cloud scan, the back-end part 21 and the front-end part 123b function effectively. The processing described in FIG. 17 regarding the cloud pull print corresponds to FIG. 24 among FIGS. 24 to 26. That is, in FIG. 17, in step S223, the device service mediating unit 216 sends a print request to the device service disclosure unit 134 of the front-end part 123b. If the operation information sent in step S218 is an HTTP request, the print request may be an HTTP response to the HTTP request.

However, regarding the cloud pull print, the same processing as FIG. 25 or FIG. 26 may be enabled. In order to enable the same processing as FIG. 25 regarding the cloud pull print, the device service mediating unit 216 only has to send a print request including data file of a document to the device service unit 121b. Moreover, in order to enable the same processing as FIG. 26 regarding the cloud pull print, the browser unit 212 only has to send an HTTP request indicating a print request and including the data file of the document to the server apparatus 50. The server apparatus 50, in response to the HTTP request, only has to send the print request including the data file to the device service unit 121b. However, in this case, it is necessary to change the definition content of HTML of the Web application regarding the cloud pull print.

The server apparatus 50 and the external browser apparatus 20 may be the same computer. In this case, the computer may determine, depending on a source of the acquisition request of content data of Web application, whether to send the content data as they are or to convert into screen layout data using a function of the external browser apparatus 20. For example, information indicating whether the content data of the Web application can be sent as they are or whether it is necessary to convert the content data into screen layout data that may be stored for each machine body or device model of the image forming apparatus 10 in a storage device or the like to which the computer can refer. Alternatively, information indicating whether content data can be interpreted may be included in the acquisition request of content data from the image forming apparatus 10.

Second Embodiment

Next, a second embodiment will be described. A part of the second embodiment different from the first embodiment will be explained. Therefore, a part which is not mentioned in particular may be the same as in the first embodiment.

Figure 27:
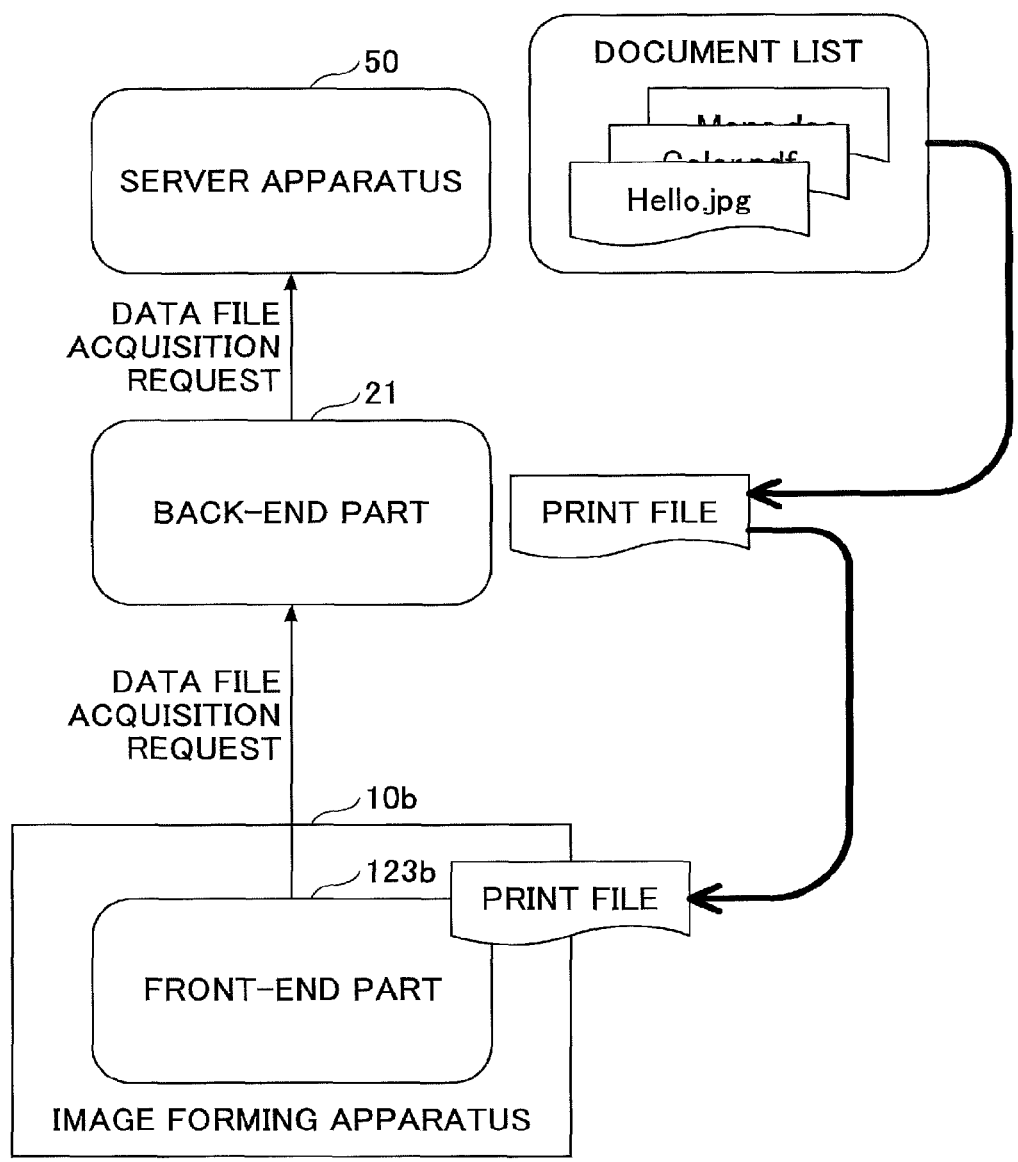
FIG. 27 is a diagram depicting a transfer path for a data file according to the first embodiment.

FIG. 27 is a diagram depicting a transfer path for a data file according to the first embodiment. In steps S221 to S223 (FIG. 17) in the first embodiment, as shown in FIG. 27, a data file is relayed by the back-end part 21. In FIG. 27, the "PRINT FILE" represents a data file after conversion into the format that the image forming apparatus 10b can print.

Figure 28:
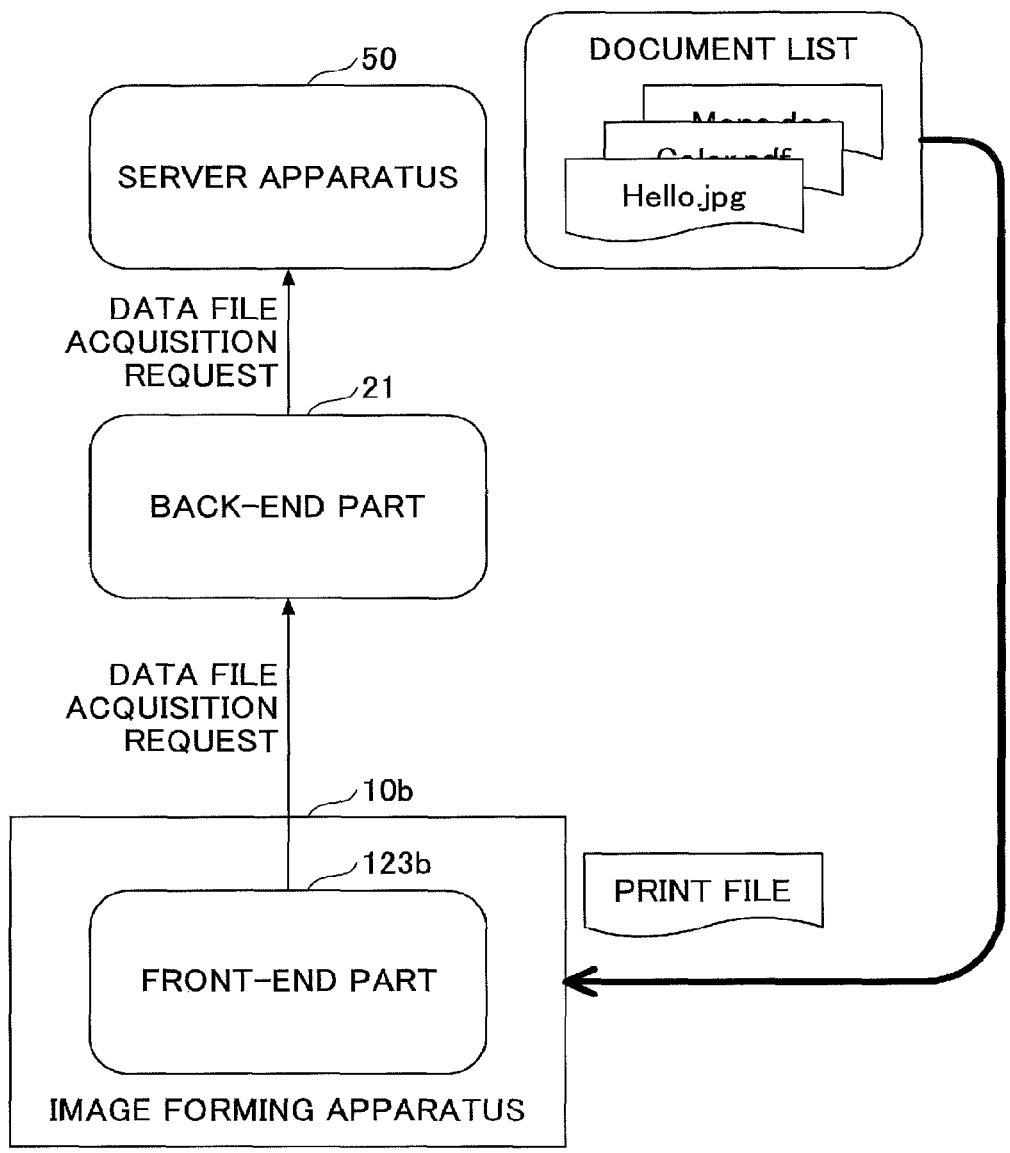
FIG. 28 is a diagram depicting a transfer path for a data file according to a second embodiment.

FIG. 28 is a diagram depicting a transfer path for a data file according to a second embodiment. In the second embodiment, an example in which a data file is transferred to the front-end part 123b (image forming apparatus 10b) without passing through the back-end part 21, as shown in FIG. 28, will be described. That is, FIG. 28 shows an example where a data file is directly forwarded from the server apparatus 50 to the front-end part 123b. As a result, a transfer time of the data file can be expected to be shortened, and the operability of the image forming apparatus 10b can be enhanced.

Figure 29:
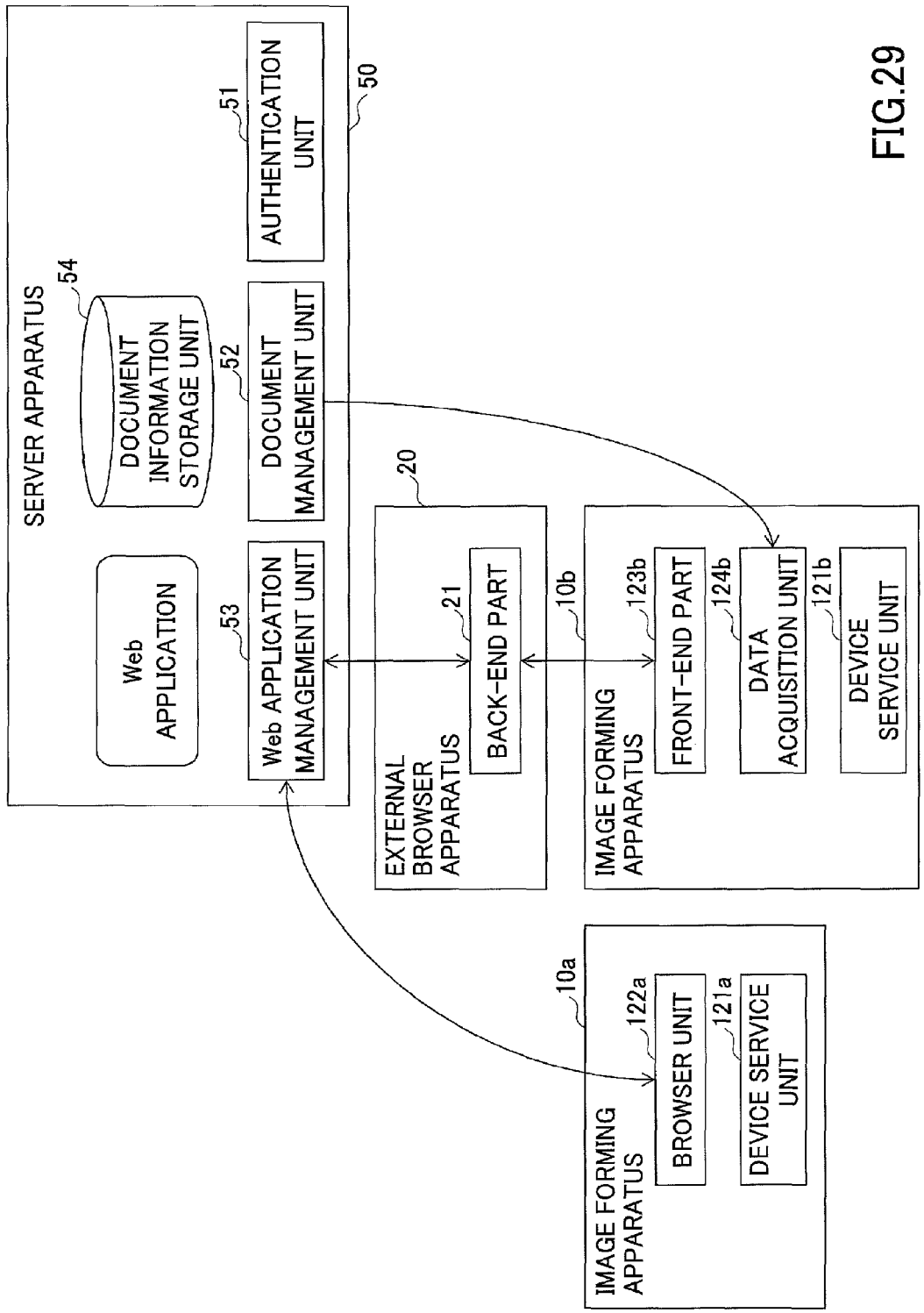
FIG. 29 is a diagram for explaining an example functional configuration of respective apparatuses according to the second embodiment.

For a data file, in order to make such a transfer path realizable, in the second embodiment, the image forming apparatus 10b or the like has a functional configuration, as shown in FIG. 29, for example.

FIG. 29 is a diagram for explaining an example functional configuration of the respective apparatuses according to the second embodiment. In FIG. 29, the same reference numeral is assigned to the same member as in FIG. 4, and an explanation thereof will be omitted.

In FIG. 29, the image forming apparatus 10b further includes a data acquisition unit 124b. The data acquisition unit 124b acquires data managed in the server apparatus 50 without passing through the back-end part 21. In the embodiment, a data file of a document managed by the document management unit 52 is acquired by the data acquisition unit 124b.

Figure 30:
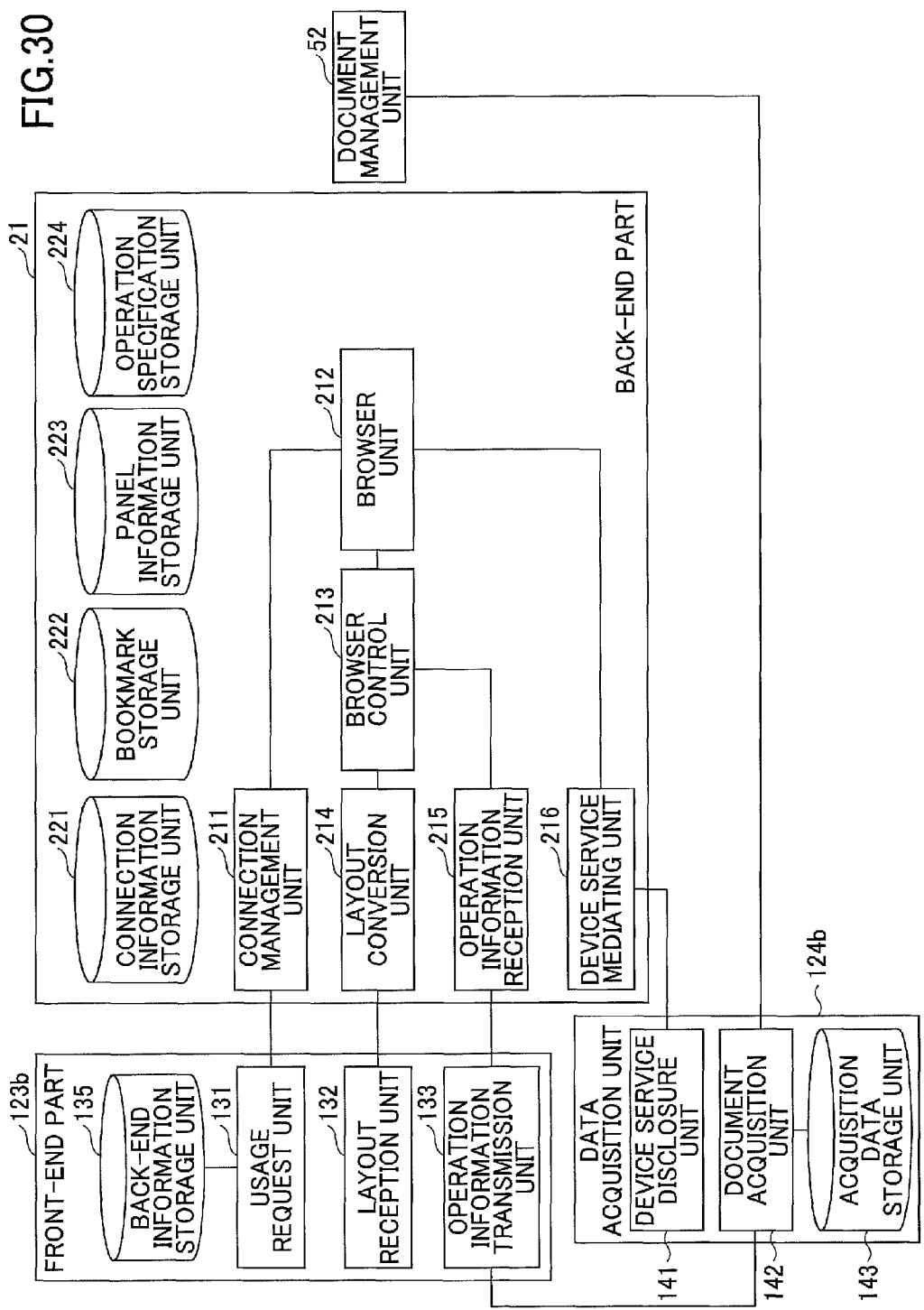
FIG. 30 is a diagram depicting an example functional configuration of a back-end part, a front-end part and a data acquisition unit according to the second embodiment.

FIG. 30 is a diagram depicting an example functional configuration of the back-end part, the front-end part and the data acquisition unit according to the second embodiment. In FIG. 30, the same reference numeral is assigned to the same member as in FIG. 6, and an explanation thereof will be omitted.

In FIG. 30, the data acquisition unit 124b includes a device service disclosure unit 141 and a document acquisition unit 142 and the like. The above-described respective units are enabled by a process in which one or more programs installed in the image forming apparatus 10b are executed by the CPU 111 of the image forming apparatus 10b. The data acquisition unit 142 further includes an acquisition data storage unit 143. The acquisition data storage unit 143 can be realized by using the HDD 114 of the image forming apparatus 10b, for example.

The device service disclosure unit 141 realizes the same function as the device service disclosure unit 141 included in the front-end part 123b in the first embodiment. That is, in the second embodiment, the function of the device service disclosure unit 141 is transferred from the front-end part 123 to the data acquisition unit 124b. Therefore, in FIG. 30, the front-end part 123b does not include the device service disclosure unit 141.

The document acquisition unit 142, as described in FIG. 29, directly acquires (downloads) a data file of a document from the document management unit 52. The document acquisition unit 142 stores the acquired data file into the acquisition data storage unit 143. Acquisition of the data file by the document acquisition unit 142 can also be performed before the file that is an object of printing is determined. The document that is an object of printing is determined when the print button 512 is held down. Therefore, the acquisition of data file by the data acquisition unit 142 can be performed before the print button 512 is held down. According to the above-described processing, a time from the print button 512 is held down until the execution of print begins can be shortened.

Figure 31:
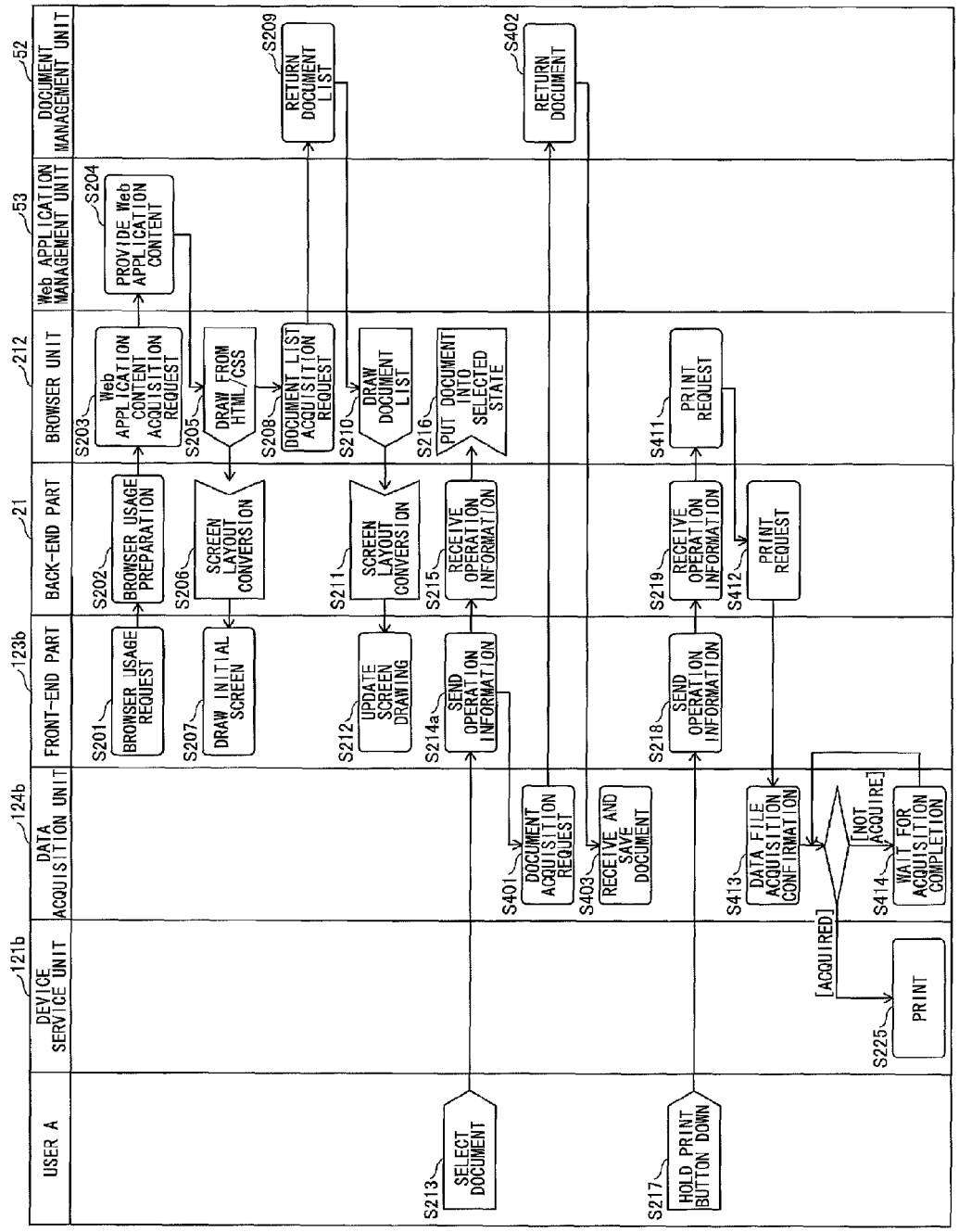
FIG. 31 is a diagram for explaining an example process that an information processing apparatus which does not have compatibility with a Web application executes for a Web application of the cloud pull print according to the second embodiment.

In the second embodiment, the processing of FIG. 17 is changed as shown in FIG. 31. FIG. 31 is a diagram for explaining an example process that an information processing apparatus which does not have compatibility with a Web application executes for the Web application of the cloud pull print according to the second embodiment. In FIG. 31, the same step number is assigned to step which is the same as in FIG. 17, and an explanation thereof will be appropriately omitted.

In FIG. 31, step S214 is replaced by step S214a. In step S214a, the operation information transmission unit 133 of the front-end part 123b of the object device, in the same way as step S214 in FIG. 17, sends operation information including identification information (document ID) corresponding to the selected list item and information indicating that the list item is selected to the back-end part 21. Moreover, the operation information transmission unit 133, based on that the identification information corresponding to the selected list item begins with "Doc", determines that the identification information is the document ID. In this case, the operation information transmission unit 133 reports the document ID to the document acquisition unit 142 of the data acquisition unit 124b.

The document acquisition unit 142 verifies whether a data file of a document regarding the document ID is stored in the acquisition data storage unit 143. If the data file is not stored, the document acquisition unit 142 sends an acquisition request for document including the document ID to the document management unit 52 of the server apparatus 50 (step S401). The document management unit 52, in response to the acquisition request, replies bibliographic information which is stored in the document information storage unit 54 in association with the document ID included in the acquisition request and data file identified by a URI of the bibliographic information to the document acquisition unit 142 (step S402). As a result, the data file is transferred to the front-end part 123b without passing through the back-end part 21. The document acquisition unit 142, when receiving the bibliographic information and the data file, stores the data file into the HDD 114 of the object device and stores the bibliographic information into the acquisition data storage unit 143 (step S403).

FIG. 32 is a diagram depicting an example design of the acquisition data storage unit. In FIG. 32, a record of the acquisition data storage unit 143 has the same design as the record of the document information storage unit 54 (FIG. 9). However, each record of the acquisition data storage unit 143 has an item of "status". The "status" is information indicating a progress situation of an acquisition process (download process) of a data file. For example, when it is a data file with a great size of data, it may be divided for each page and downloaded. In such a case, each time data of one page are received, a value of "status" is updated. Processes in steps S401 to S403 are performed in parallel with or asynchronously with the processes in other steps (for example, steps S214 to S216 or step S218 and later). Therefore, responsiveness of selection for list items will not be degraded.

The selection of the list item does not necessarily mean that the document corresponding to the list item is determined to be an object of printing. This is because a selected state of the list item can be released afterwards. From the above-described point of view, the acquisition of the data file in this stage can be said to be speculative. Alternatively, the acquisition of the data file in this stage can be said to be previous acquisition or acquisition based on prediction. The prediction is prediction that possibility of printing the selected document is high.

Moreover, in FIG. 31, in step S219, when event information indicating that the print button 512 is held down is input to the browser unit 212, the browser unit 212, based on the script of the Web application of the cloud pull print, requires the device service mediating unit 216 of the back-end part 21 to print (step S411). The request includes a value of a "Value" attribution of a "CheckBox" node, in which a value of a "Checked" attribution is "true" (i.e. a document ID).

The device service mediating unit 216, in response to the request, sends a print request including the document ID to the device service disclosure unit 141 of the data acquisition unit 124b of the object device (step S412). The device service disclosure unit 141, upon receiving the print request, verifies whether a data file of a document related to the document ID included in the print request has already been acquired in the object device (step S413). It is possible to be determine whether the document has been acquired, based on a value of a "status" stored in the acquisition data storage unit 143 in association with the document ID.

The device service disclosure unit 141, regarding an acquired data file, requires the device service unit 121b to print the data file. In contrast, the device service disclosure unit 141, regarding a data file that has not been acquired, waits for a completion of the acquisition (download) which starts in step S401 (step S414), and requires the device service unit 121b to print the data file.

The timing in which the data file is acquired in advance may be in a stage before step S401. For example, the layout reception unit 132 of the front-end part 123b, when screen layout information received in step S212 includes a document ID (ID beginning with "Doc"), may report the document ID to the document acquisition unit 142. In this case, the document acquisition unit 142 may acquire the data file of the document related to each document ID that is reported, from the document management unit 52.

Moreover, in the stage where the user logs in the image forming apparatus 10b (that is, in the stage where a user of the image forming apparatus 10b is identified), the data file may be acquired. In this stage, the document acquisition unit 142 specifies the user ID of the login user, and sends an acquisition request for the data file to the document management unit 52. The document management unit 52 sends the data file of the document, a destination of which is the user ID, to the document acquisition unit 142.

In the above description, an example where data transferred from the server apparatus 50 to the image forming apparatus 10b are transferred without passing through the back-end part 21 is described, as the cloud pull print. However, the data forwarded from the image forming apparatus 10b to the server apparatus 50 may be transferred without passing through the back-end part 21, as the cloud scanning. In this case, the device service unit 121b, upon performing a scan from a document, stores a scan image into the acquisition data storage unit 143. The document acquisition unit 142, at an arbitrary timing asynchronously with the scan job, sends (uploads) the scan image stored in the acquisition data storage unit 143 to the server apparatus 50.

Third Embodiment

Next, a third embodiment will be described. A part of the third embodiment different from the second embodiment will be explained. Therefore, a part which is not mentioned in particular may be the same as in the second embodiment.

Figure 33:
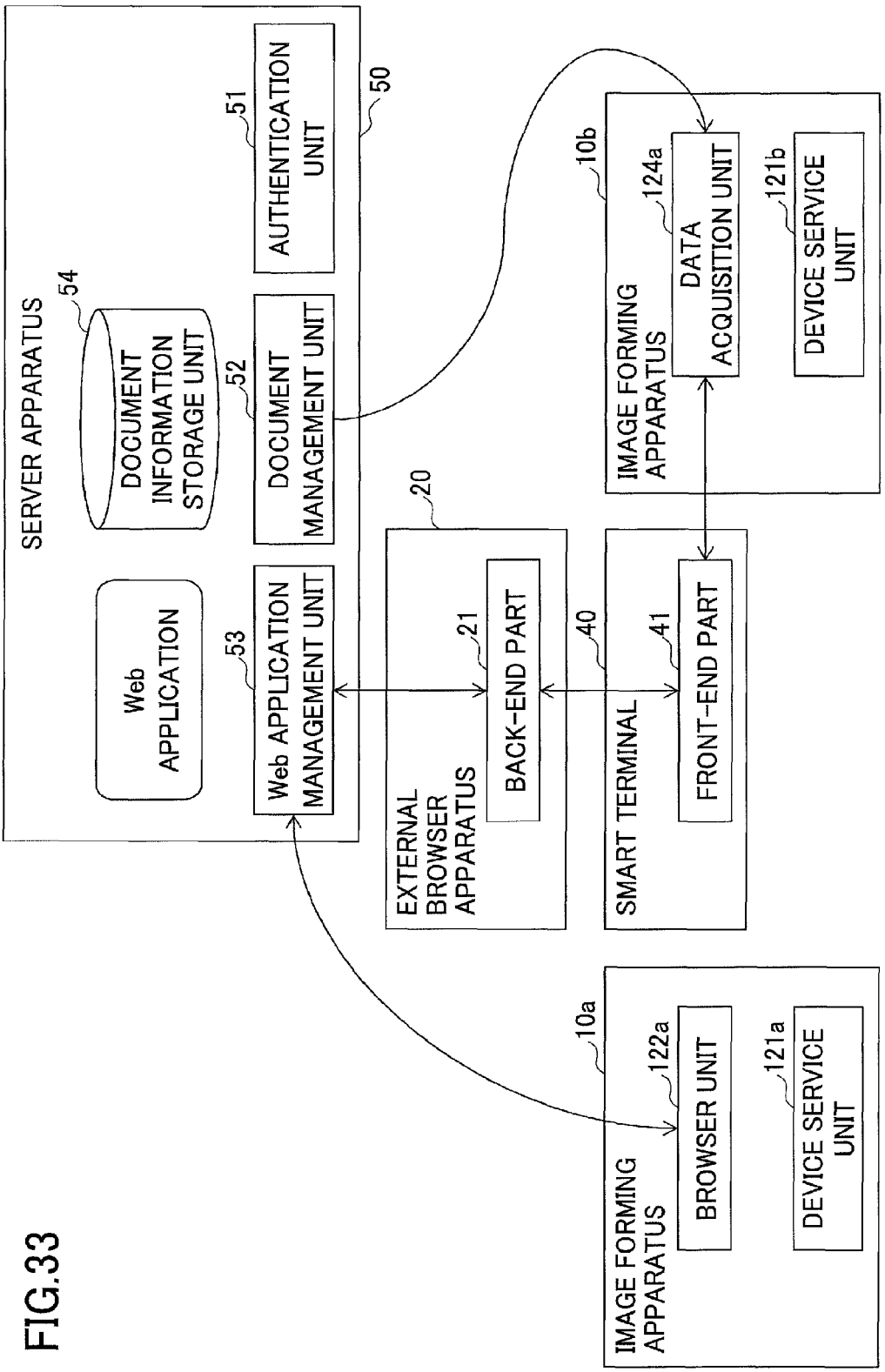
FIG. 33 is a diagram for explaining an example functional configuration of respective apparatuses according to a third embodiment.

FIG. 33 is a diagram for explaining an example functional configuration of respective apparatuses according to the third embodiment. In FIG. 33, a smart terminal is added. The smart terminal 40 is for example, a smartphone, a tablet type terminal or the like. The smart terminal 40 is connected to the image forming apparatus 10b for a communications connection via a wireless communication such as WiFi (trademark registered) Direct, NFC (Near field communication) or Bluetooth (trademark registered). Moreover, the smart terminal 40 is connected to the external browser apparatus 20 for a communications connection via a wireless LAN, a mobile communication network or the like.

In FIG. 33, the smart terminal 40 includes a front-end part 41. The front-end part 41 realizes the same function as the front-end part 123b that the image forming apparatus 10b has, in FIG. 30. The front-end part 41 is enabled by a process in which one or more programs installed in the smart terminal 40 are executed by a CPU of the smart terminal 40. In FIG. 33, the image forming apparatus 10b may not have the front-end part 123b.

In the third embodiment, in the processing shown in FIG. 31, the process performed by the front-end part 123b of the image forming apparatus 10b is performed by the front-end part 41 of the smart terminal 40. In this way, the operation panel 15 of the image forming apparatus 10b can be substituted for by the smart terminal 40.

As is clear from FIG. 33, the data file does not pass through the smart terminal 40. Therefore, even when the smart terminal 40 is a user's privately owned smartphone or the like, it is possible to prevent a data file related to confidential information from being stored in the smart terminal 40. Moreover, it is possible to suppress an increase in a communication cost of the smart terminal 40.

Fourth Embodiment

Next, a fourth embodiment will be described. A part of the fourth embodiment different from the third embodiment will be explained. Therefore, a part which is not mentioned in particular may be the same as in the third embodiment.

Figure 34:
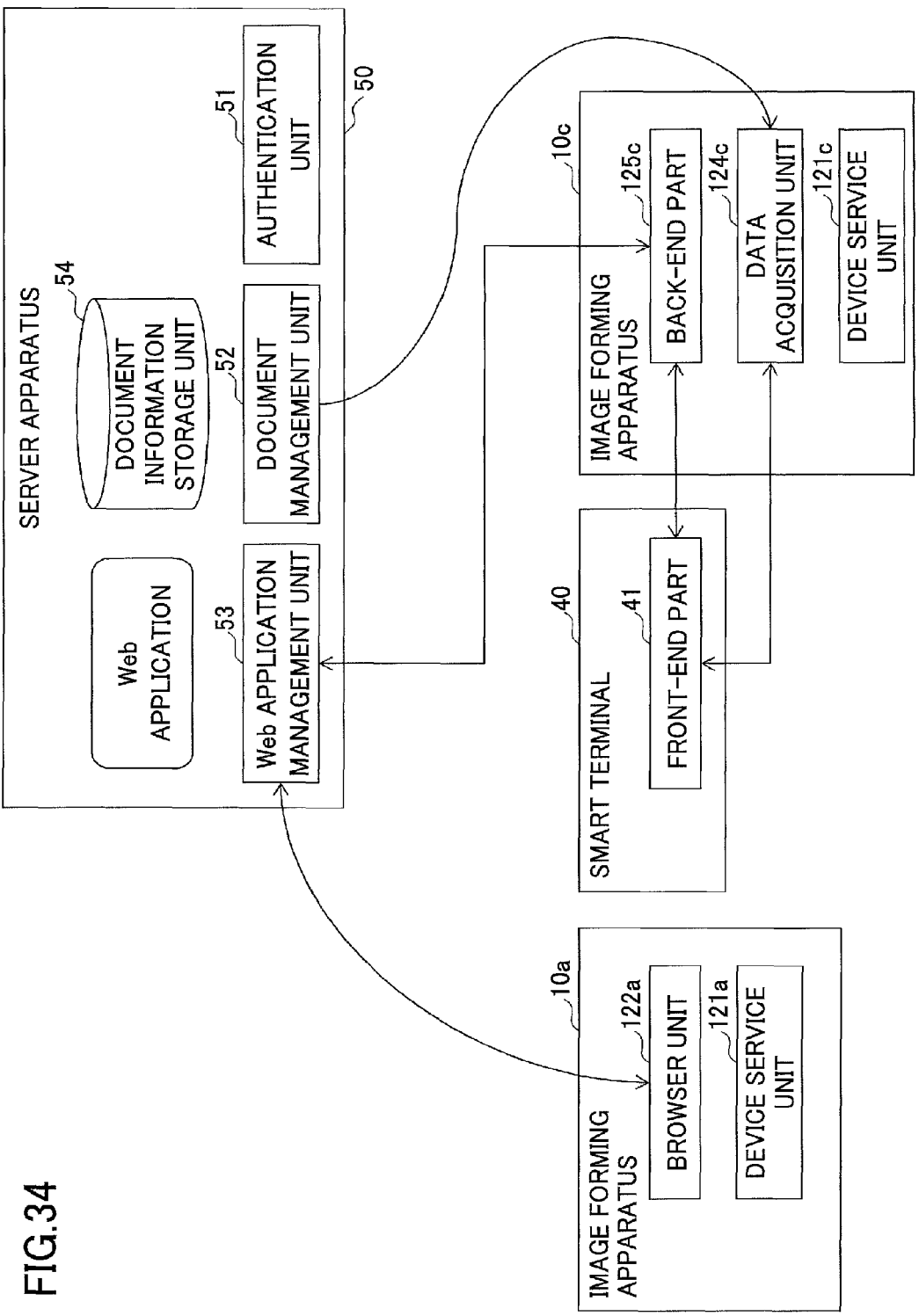
FIG. 34 is a diagram for explaining an example functional configuration of respective apparatuses according to a fourth embodiment.

FIG. 34 is a diagram for explaining an example functional configuration of respective apparatuses according to the fourth embodiment. In FIG. 34, an image forming apparatus 10c is added.

The image forming apparatus 10c includes a back-end part 125c, a data acquisition unit 124c and a device service unit 121c. The respective units are enabled by a process in which one or more programs installed in the image forming apparatus 10c are executed by a CPU 111 of the image forming apparatus 10c. The data acquisition unit 124c and the device service unit 121c realize the same functions as the data acquisition unit 124b and the device service unit 121b that the image forming apparatus 10h has, in FIG. 29. The back-end part 125c realizes the same function as the back-end part 21 that the external browser apparatus 20 has, in FIG. 29.

In addition, the image forming apparatus 10b and the external browser apparatus 20 may be included in FIG. 23, in the same way as FIG. 30 or FIG. 33.

In the fourth embodiment, in the processing shown in FIG. 31, the process performed by the back-end part 21 of the external browser apparatus 20 is performed by the back-end part 125c of the image forming apparatus 10c. In this way, necessity to separately provide the external browser apparatus 20 can be decreased, and it is possible to reduce the cost of the entire system.

In the second to fourth embodiments, examples where the data file of the document is preliminarily acquired are described. For example, setting information regarding printing, other setting information or the like may be an object of the data acquired preliminarily.

Moreover, the respective embodiments may be applied to a device other that the image forming apparatus 10. For example, the embodiments may be applied to a Web application related to a projector, an electronic blackboard, a digital camera, a video conference system or the like.

Moreover, the embodiments may be applied to data other than the Web application. For example, when data (e.g. display data) that can be interpreted is different between the first device and the second device, an apparatus equivalent to the external browser apparatus 20 may be connected to the first or the second device (e.g. the second device). The apparatus may convert the data that the first device can interpret so that the second device can interpret the data, and provide a result of conversion to the second device.

In the embodiments, the external browser apparatus is an example of an information processing apparatus. The image forming apparatus 10b is an example of a device. The layout conversion unit 214 is an example of a conversion unit and a first transmission unit. The operation information reception unit 215 is an example of a first reception unit. The device service mediating unit 216 is an example of a second transmission unit recited in claim 1. The browser unit 212 is an example of a drawing unit and a second transmission unit recited in claim 2. The document acquisition unit 142 is an example of an acquisition unit. The first format is a format of the screen layout data. The second format is a format of content data of the Web application. The operation panel 15 is an example of a display unit of a device. The smart terminal 40 is an example of an information processing terminal. The respective documents included in the document list are examples of a selection candidate.

Regarding the kinds of application platforms, performing development and maintenance of the same application program is not efficient. In other words, when the latest application platform is a browser-based application platform, if all application programs can be provided as Web applications, it is efficient.

However, for a Web application corresponding to a Web browser installed in the latest model, it is not necessarily easy to ensure compatibility in an old model. Furthermore, there are models in which the Web browser cannot be installed, or there are models which require replacement of firmware or the like in order to cause the Web browser to operate.

In addition, such problems are considered to be common regarding data in formats other than Web applications.

According to the embodiments of the present invention, incompatibility regarding data formats among apparatuses can be removed.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programmed by software to execute the corresponding functions and hardware which is designed to execute the corresponding functions such as the ASIC and the circuit module.

Further, the present invention is not limited to these embodiments, but various variations and modifications may be made without departing from the scope of the present invention.

What is claimed is:

1. An information processing system comprising:
   a device; and
   an information processing apparatus that can communicate with the device, the information processing apparatus including circuitry configured to
      convert data in a second format, different from a first format processable for the device, to generate data in the first format,
      send the data generated by the circuitry to the device,
      receive, from the device, information indicating an operation to a screen, which is displayed on a display of the device based on the data sent by the circuitry, and
      send, to the device, an instruction to perform processing related to the operation indicated by the information received by the circuitry, the processing being defined in the data in the second format,
   wherein
      the device includes device circuitry configured to
         acquire data that is an object to be processed in the processing performed in accordance with the instruction, via a network without passing through the information processing apparatus, the device circuitry acquiring the data that is the object to be processed in parallel with the circuitry of the information processing apparatus receiving the information indicating the operation to the screen, both in response to the device sending the information indicating the operation to the screen to the information processing apparatus.

2. The information processing system according to claim 1,
   wherein the screen includes a list of selection candidates for the object to be processed, and
   wherein the circuitry is configured to acquire, in response to selection of a candidate from the selection candidates, data corresponding to the selected candidate, via the network without passing through the information processing apparatus.

3. The information processing system according to claim 1,
   wherein the screen includes a list of selection candidates for the object to be processed, and
   wherein the circuitry is configured to acquire, in response to display of the screen by the display, data corresponding to the respective selection candidates included in the list, via the network without passing through the information processing apparatus.

4. The information processing system according to claim 1,
   wherein the circuitry is configured to acquire, when identification information of a user of the device is specified, data stored in association with the identification information, via the network without passing through the information processing apparatus.

5. An information processing method comprising:
   converting, by an information processing apparatus that can communicate with a device, second data in a second format, different from a first format processable for the device, to generate first data in the first format;
   sending the first data from the information processing apparatus to the device;
   receiving, by the information processing apparatus, from the device, information indicating an operation to a screen, which is displayed on a display of the device based on the first data; and
   sending from the information processing apparatus to the device, an instruction to perform processing related to the operation indicated by the information, the processing being defined in the second data, wherein
   the receiving of the information indicating the operation to the screen by the information processing apparatus being performed in parallel with the device acquiring third data that is an object to be processed in the processing performed in accordance with the instruction, via a network without passing through the information processing apparatus, the receiving by the information processing apparatus and the acquiring by the device being performed in response to the device sending the information indicating the operation to the screen to the information processing apparatus.

6. The information processing method according to claim 5, further comprising:
acquiring, by the device, in response to selection of a candidate from selection candidates, data corresponding to the selected candidate, via the network without passing through the information processing apparatus,
wherein the screen includes a list of the selection candidates for the object to be processed.

7. The information processing method according to claim 5, further comprising:
acquiring, by the device, in response to display of the screen by the display, data corresponding to respective selection candidates included in a list, via the network without passing through the information processing apparatus,
wherein the screen includes the list of the selection candidates for the object to be processed.

8. The information processing method according to claim 5, further comprising:
acquiring, by the device, when identification information of a user of the device is specified, data stored in association with the identification information, via the network without passing through the information processing apparatus.

9. A non transitory computer-readable storage medium including computer executable instructions, wherein the instructions, when executed by an information processing apparatus, cause the information processing apparatus to perform a method, the method comprising:
converting, by the information processing apparatus, second data in a second format, different from a first format processable for a device, to generate first data in the first format;
sending the first data from the information processing apparatus to the device;
receiving, by the information processing apparatus, from the device, information indicating an operation to a screen, which is displayed on a display of the device based on the first data; and
sending from the information processing apparatus to the device, an instruction to perform processing related to the operation indicated by the information, the processing being defined in the second data, wherein
the receiving of the information indicating the operation to the screen by the information processing apparatus being performed in parallel with the device acquiring third data that is an object to be processed in the processing performed in accordance with the instruction, via a network without passing through the information processing apparatus, the receiving by the information processing apparatus and the acquiring by the device being performed in response to the device sending the information indicating the operation to the screen to the information processing apparatus.

10. The non-transitory computer-readable storage medium according to claim 9, further comprising:
acquiring, by the device, in response to selection of a candidate from selection candidates, data corresponding to the selected candidate, via the network without passing through the information processing apparatus,
wherein the screen includes a list of the selection candidates for the object to be processed.

11. The non-transitory computer-readable storage medium according to claim 9, further comprising;
acquiring, by the device, in response to display of the screen by the display, data corresponding to respective selection candidates included in a list, via the network without passing through the information processing apparatus,
wherein the screen includes the list of the selection candidates for the object to be processed.

12. The non-transitory computer-readable storage medium according to claim 9, further comprising;
acquiring, by the device, when identification information of a user of the device is specified, data stored in association with the identification information, via the network without passing through the information processing apparatus.

* * * * *